US011775182B2

(12) United States Patent
Hua et al.

(10) Patent No.: US 11,775,182 B2
(45) Date of Patent: Oct. 3, 2023

(54) EXPANDING RAID SYSTEMS

(71) Applicant: EMC IP Holding Company LLC, Hopkinton, MA (US)

(72) Inventors: Kuolin Hua, Natick, MA (US); Kunxiu Gao, Boxborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 131 days.

(21) Appl. No.: 17/382,905

(22) Filed: Jul. 22, 2021

(65) Prior Publication Data
US 2023/0027532 A1   Jan. 26, 2023

(51) Int. Cl.
*G06F 3/06* (2006.01)
*G06F 7/78* (2006.01)
(52) U.S. Cl.
CPC ............ *G06F 3/062* (2013.01); *G06F 3/0631* (2013.01); *G06F 3/0646* (2013.01); *G06F 3/0689* (2013.01); *G06F 7/78* (2013.01)
(58) Field of Classification Search
CPC ...... G06F 3/062; G06F 3/0631; G06F 3/0646; G06F 3/0689; G06F 7/78
See application file for complete search history.

(56) References Cited

U.S. PATENT DOCUMENTS

| | | | | |
|---|---|---|---|---|
| 11,474,901 | B2* | 10/2022 | Hua | G06F 3/0619 |
| 11,507,287 | B1* | 11/2022 | Hua | G06F 11/10 |
| 2010/0057789 | A1* | 3/2010 | Kawaguchi | G06F 11/2082 707/E17.005 |
| 2016/0299952 | A1* | 10/2016 | Cialini | G06F 16/24558 |
| 2022/0107871 | A1* | 4/2022 | Hua | G06F 3/0631 |

OTHER PUBLICATIONS

U.S. Appl. No. 16/891,116, filed Jun. 3, 2020, "Growing and Spitting a Disk Array By Moving Raid Members," (120021.01).

* cited by examiner

*Primary Examiner* — Sean D Rossiter
(74) *Attorney, Agent, or Firm* — Muirhead and Saturnelli, LLC

(57) ABSTRACT

Physical storage devices (PSDs) of a protection group cluster (PGC) may be represented by a protection group matrix (PGM) having a plurality of rows and a plurality of columns, where each row corresponds to a PSD of the PGC, and each column corresponds to a partition of each PSD. The value specified in each cell at an intersection of a row and column specifies the protection group of the PGC to which the partition of the PSD represented by the column and row, respectively, is (or will be) assigned. In response to one or more of PSDs being added to a PGC, the PGM may be reconfigured, including adding new rows, and transposing portions of columns to the new rows, or transposing portions of rows to portions of columns of the new rows. Protection members of the PGC may be re-assigned based on the reconfiguration.

20 Claims, 18 Drawing Sheets

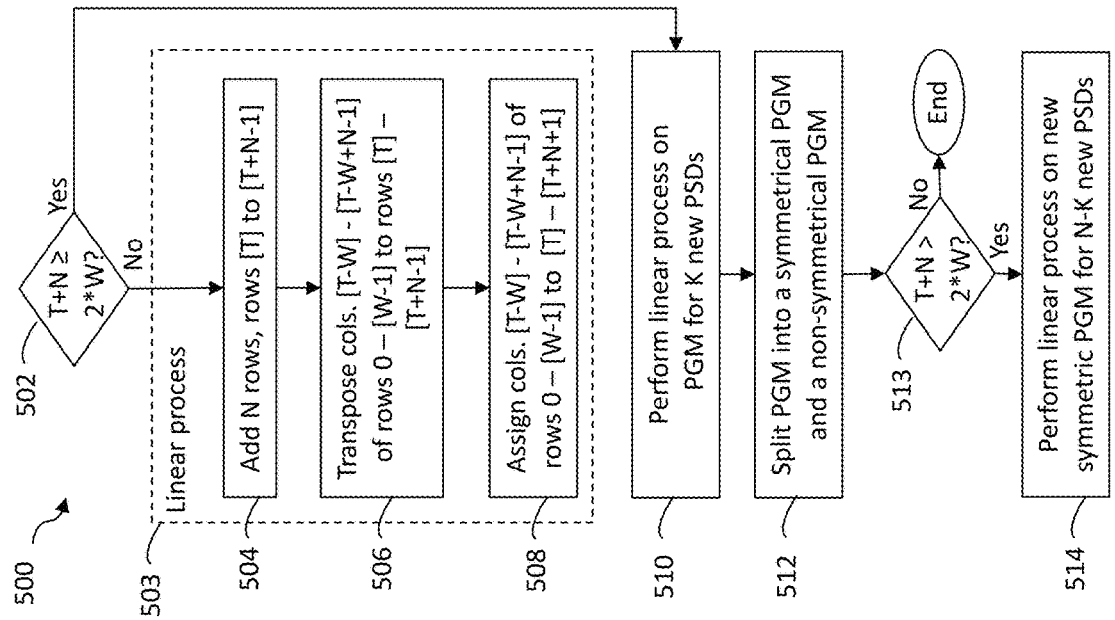
FIG. 5
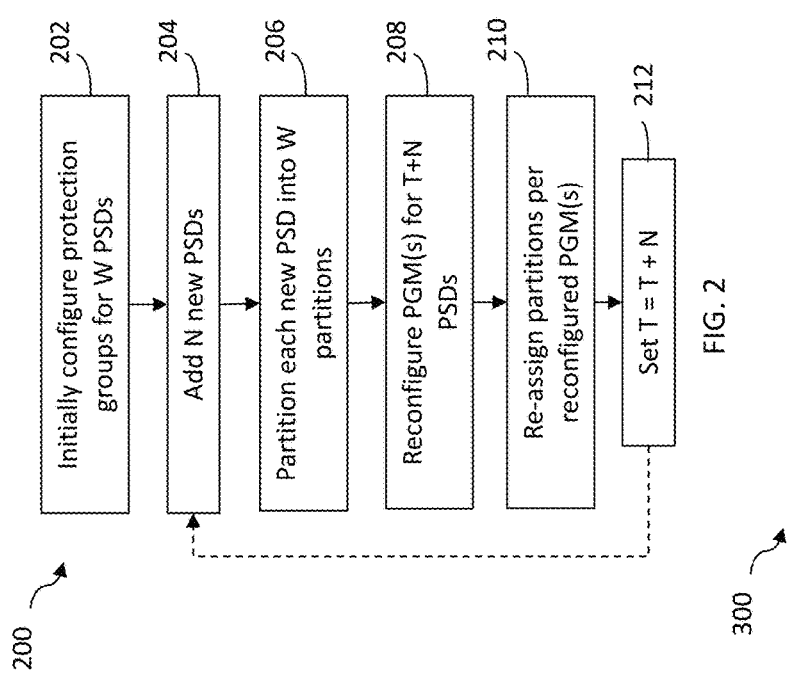
FIG. 2
FIG. 3

| PSD(row) | 0 | 1 | 2 | 3 | 4 | 5 | 6 | 7 | 8 |
|---|---|---|---|---|---|---|---|---|---|
| 0 (0) | 0 | 1 | 2 | 3 | 4 | 5 | 6 | 7 | 8 |
| 1 (1) | 1 | 2 | 3 | 4 | 5 | 6 | 7 | 8 | 0 |
| 2 (2) | 2 | 3 | 4 | 5 | 6 | 7 | 8 | 0 | 1 |
| 3 (3) | 3 | 4 | 5 | 6 | 7 | 8 | 0 | 1 | 2 |
| 4 (4) | 4 | 5 | 6 | 7 | 8 | 0 | 1 | 2 | 3 |
| 5 (5) | 5 | 6 | 7 | 8 | 0 | 1 | 2 | 3 | 4 |
| 6 (6) | 6 | 7 | 8 | 0 | 1 | 2 | 3 | 4 | 5 |
| 7 (7) | 7 | 8 | 0 | 1 | 2 | 3 | 4 | 5 | 6 |
| 8 (8) | 8 | 0 | 1 | 2 | 3 | 4 | 5 | 6 | 7 |

FIG. 4

| PSD(row) | 0 | 1 | 2 | 3 | 4 | 5 | 6 | 7 | 8 |
|---|---|---|---|---|---|---|---|---|---|
| 0(0) | 0 | 1 | 2 | 3 | 4 | 5 | 6 | 7 | 8 |
| 1(1) | 1 | 2 | 3 | 4 | 5 | 6 | 7 | 8 | 0 |
| 2(2) | 2 | 3 | 4 | 5 | 6 | 7 | 8 | 0 | 1 |
| 3(3) | 3 | 4 | 5 | 6 | 7 | 8 | 0 | 1 | 2 |
| 4(4) | 4 | 5 | 6 | 7 | 8 | 0 | 1 | 2 | 3 |
| 5(5) | 5 | 6 | 7 | 8 | 0 | 1 | 2 | 3 | 4 |
| 6(6) | 6 | 7 | 8 | 0 | 1 | 2 | 3 | 4 | 5 |
| 7(7) | 7 | 8 | 0 | 1 | 2 | 3 | 4 | 5 | 6 |
| 8(8) | 8 | 0 | 1 | 2 | 3 | 4 | 5 | 6 | 7 |
| W=9(9) | | | | | | | | | |
| W+1=10(10) | | | | | | | | | |
| W+2=11(11) | | | | | | | | | |
| W+3=12(12) | | | | | | | | | |
| W+4=13(13) | | | | | | | | | |
| W+5=14(14) | | | | | | | | | |

| PSD(row) | 0 | 1 | 2 | 3 | 4 | 5 | 6 | 7 | 8 |
|---|---|---|---|---|---|---|---|---|---|
| 0(0) | 9 | 9 | 9 | 9 | 9 | 9 | 9 | 9 | 9 |
| 1(1) | 10 | 10 | 10 | 10 | 10 | 10 | 10 | 10 | 10 |
| 2(2) | 11 | 11 | 11 | 11 | 11 | 11 | 11 | 11 | 11 |
| 3(3) | 12 | 12 | 12 | 12 | 12 | 12 | 12 | 12 | 12 |
| 4(4) | 13 | 13 | 13 | 13 | 13 | 13 | 13 | 13 | 13 |
| 5(5) | 14 | 14 | 14 | 14 | 14 | 14 | 14 | 14 | 14 |
| 6(6) | 15 | 15 | 15 | 15 | 15 | 15 | 15 | 15 | 15 |
| 7(7) | 16 | 16 | 16 | 16 | 16 | 16 | 16 | 16 | 16 |
| 8(8) | 17 | 17 | 17 | 17 | 17 | 17 | 17 | 17 | 17 |

400b

| PSD(row) | 0 | 1 | 2 | 3 | 4 | 5 | 6 | 7 | 8 |
|---|---|---|---|---|---|---|---|---|---|
| 9(0) | 0 | 1 | 2 | 3 | 4 | 5 | 6 | 7 | 8 |
| 10(1) | 1 | 2 | 3 | 4 | 5 | 6 | 7 | 8 | 0 |
| 11(2) | 2 | 3 | 4 | 5 | 6 | 7 | 8 | 0 | 1 |
| 12(3) | 3 | 4 | 5 | 6 | 7 | 8 | 0 | 1 | 2 |
| 13(4) | 4 | 5 | 6 | 7 | 8 | 0 | 1 | 2 | 3 |
| 14(5) | 5 | 6 | 7 | 8 | 0 | 1 | 2 | 3 | 4 |
| 15(6) | 6 | 7 | 8 | 0 | 1 | 2 | 3 | 4 | 5 |
| 16(7) | 7 | 8 | 0 | 1 | 2 | 3 | 4 | 5 | 6 |
| 17(8) | 8 | 0 | 1 | 2 | 3 | 4 | 5 | 6 | 7 |

FIG. 10A

| PSD(row) | 0 | 1 | 2 | 3 | 4 | 5 | 6 | 7 | 8 |
|---|---|---|---|---|---|---|---|---|---|
| 0(0) | 9 | 10 | 11 | 12 | 13 | 14 | 15 | 16 | 17 |
| 1(1) | 9 | 10 | 11 | 12 | 13 | 14 | 15 | 16 | 17 |
| 2(2) | 9 | 10 | 11 | 12 | 13 | 14 | 15 | 16 | 17 |
| 3(3) | 9 | 10 | 11 | 12 | 13 | 14 | 15 | 16 | 17 |
| 4(4) | 9 | 10 | 11 | 12 | 13 | 14 | 15 | 16 | 17 |
| 5(5) | 9 | 10 | 11 | 12 | 13 | 14 | 15 | 16 | 17 |
| 6(6) | 9 | 10 | 11 | 12 | 13 | 14 | 15 | 16 | 17 |
| 7(7) | 9 | 10 | 11 | 12 | 13 | 14 | 15 | 16 | 17 |
| 8(8) | 9 | 10 | 11 | 12 | 13 | 14 | 15 | 16 | 17 |

400a

| PSD(row) | 0 | 1 | 2 | 3 | 4 | 5 | 6 | 7 | 8 |
|---|---|---|---|---|---|---|---|---|---|
| 9(0) | 18 | 1 | 2 | 3 | 4 | 5 | 6 | 7 | 8 |
| 10(1) | 18 | 2 | 3 | 4 | 5 | 6 | 7 | 8 | 0 |
| 11(2) | 18 | 3 | 4 | 5 | 6 | 7 | 8 | 0 | 1 |
| 12(3) | 18 | 4 | 5 | 6 | 7 | 8 | 0 | 1 | 2 |
| 13(4) | 18 | 5 | 6 | 7 | 8 | 0 | 1 | 2 | 3 |
| 14(5) | 18 | 6 | 7 | 8 | 0 | 1 | 2 | 3 | 4 |
| 15(6) | 18 | 7 | 8 | 0 | 1 | 2 | 3 | 4 | 5 |
| 16(7) | 18 | 8 | 0 | 1 | 2 | 3 | 4 | 5 | 6 |
| 17(8) | 18 | 0 | 1 | 2 | 3 | 4 | 5 | 6 | 7 |
| 18(9) | 0 | 1 | 2 | 3 | 4 | 5 | 6 | 7 | 8 |

| PSD(row) | 0 | 1 | 2 | 3 | 4 | 5 | 6 | 7 | 8 |
|---|---|---|---|---|---|---|---|---|---|
| 0(0) | 0 | 1 | 2 | 3 | 4 | 5 | 6 | 7 | 8 |
| 1(1) | 1 | 2 | 3 | 4 | 5 | 6 | 7 | 8 | 0 |
| 2(2) | 2 | 3 | 4 | 5 | 6 | 7 | 8 | 0 | 1 |
| 3(3) | 3 | 4 | 5 | 6 | 7 | 8 | 0 | 1 | 2 |
| 4(4) | 4 | 5 | 6 | 7 | 8 | 0 | 1 | 2 | 3 |
| 5(5) | 5 | 6 | 7 | 8 | 0 | 1 | 2 | 3 | 4 |
| 6(6) | 6 | 7 | 8 | 0 | 1 | 2 | 3 | 4 | 5 |
| 7(7) | 7 | 8 | 0 | 1 | 2 | 3 | 4 | 5 | 6 |
| 8(8) | 8 | 0 | 1 | 2 | 3 | 4 | 5 | 6 | 7 |
| W=9(9) |  |  |  |  |  |  |  |  |  |
| W+1=10(10) |  |  |  |  |  |  |  |  |  |
| W+2=11(11) |  |  |  |  |  |  |  |  |  |
| W+3=12(12) |  |  |  |  |  |  |  |  |  |
| W+4=13(13) |  |  |  |  |  |  |  |  |  |
| W+5=14(14) |  |  |  |  |  |  |  |  |  |

FIG. 13

| PSD(row) | 0 | 1 | 2 | 3 | 4 | 5 | 6 | 7 | 8 |
|---|---|---|---|---|---|---|---|---|---|
| W=9 (0) | 9 | 10 | 11 | 12 | 13 | 14 | 6 | 7 | 8 |
| W+1=10 (1) | 9 | 10 | 11 | 12 | 13 | 14 | 7 | 8 | 0 |
| W+2=11 (2) | 9 | 10 | 11 | 12 | 13 | 14 | 8 | 0 | 1 |
| W+3=12 (3) | 9 | 10 | 11 | 12 | 13 | 14 | 0 | 1 | 2 |
| W+4=13 (4) | 9 | 10 | 11 | 12 | 13 | 14 | 1 | 2 | 3 |
| W+5=14 (5) | 9 | 10 | 11 | 12 | 13 | 14 | 2 | 3 | 4 |
| W−3=6 (6) | 0 | 1 | 2 | 3 | 4 | 5 | 3 | 4 | 5 |
| W−2=7 (7) | 1 | 2 | 3 | 4 | 5 | 6 | 4 | 5 | 6 |
| W−1=8 (8) | 2 | 3 | 4 | 5 | 6 | 7 | 5 | 6 | 7 |
| 0(9) | 3 | 4 | 5 | 6 | 7 | 8 | 6 | 7 | 8 |
| 1(10) | 4 | 5 | 6 | 7 | 8 | 0 | 7 | 8 | 0 |
| 2(11) | 5 | 6 | 7 | 8 | 0 | 1 | 8 | 0 | 1 |
| 3(12) | 6 | 7 | 8 | 0 | 1 | 2 | 0 | 1 | 2 |
| 4(13) | 7 | 8 | 0 | 1 | 2 | 3 | 1 | 2 | 3 |
| 5(14) | 8 | 0 | 1 | 2 | 3 | 4 | 2 | 3 | 4 |

| PSD(row) | 0 | 1 | 2 | 3 | 4 | 5 | 6 | 7 | 8 |
|---|---|---|---|---|---|---|---|---|---|
| W=9 (0) | 9 | 10 | 11 | 12 | 13 | 14 | 15 | 16 | 17 |
| W+1=10 (1) | 9 | 10 | 11 | 12 | 13 | 14 | 15 | 16 | 17 |
| W+2=11 (2) | 9 | 10 | 11 | 12 | 13 | 14 | 15 | 16 | 17 |
| W+3=12 (3) | 9 | 10 | 11 | 12 | 13 | 14 | 15 | 16 | 17 |
| W+4=13 (4) | 9 | 10 | 11 | 12 | 13 | 14 | 15 | 16 | 17 |
| W+5=14 (5) | 9 | 10 | 11 | 12 | 13 | 14 | 15 | 16 | 17 |
| W+6=15 (6) | 9 | 10 | 11 | 12 | 13 | 14 | 15 | 16 | 17 |
| W+7=16 (7) | 9 | 10 | 11 | 12 | 13 | 14 | 15 | 16 | 17 |
| W-1=8 (8) | 9 | 10 | 11 | 12 | 13 | 14 | 15 | 16 | 17 |

400c

| PSD(row) | 0 | 1 | 2 | 3 | 4 | 5 | 6 | 7 | 8 |
|---|---|---|---|---|---|---|---|---|---|
| 1(1) | 1 | 2 | 3 | 4 | 5 | 6 | 7 | 8 | 0 |
| 2(2) | 2 | 3 | 4 | 5 | 6 | 7 | 8 | 0 | 1 |
| 3(3) | 3 | 4 | 5 | 6 | 7 | 8 | 0 | 1 | 2 |
| 4(4) | 4 | 5 | 6 | 7 | 8 | 0 | 1 | 2 | 3 |
| 5(5) | 5 | 6 | 7 | 8 | 0 | 1 | 2 | 3 | 4 |
| 15(6) | 6 | 7 | 8 | 0 | 1 | 2 | 3 | 4 | 5 |
| 16(7) | 7 | 8 | 0 | 1 | 2 | 3 | 4 | 5 | 6 |
| 17(8) | 8 | 0 | 1 | 2 | 3 | 4 | 5 | 6 | 7 |
| 0(9) | 0 | 1 | 2 | 3 | 4 | 5 | 6 | 7 | 8 |

Table 400c

| PSD(row) | 0 | 1 | 2 | 3 | 4 | 5 | 6 | 7 | 8 |
|---|---|---|---|---|---|---|---|---|---|
| W=9 (0) | 9 | 10 | 11 | 12 | 13 | 14 | 15 | 16 | 17 |
| W+1=10 (1) | 9 | 10 | 11 | 12 | 13 | 14 | 15 | 16 | 17 |
| W+2=11 (2) | 9 | 10 | 11 | 12 | 13 | 14 | 15 | 16 | 17 |
| W+3=12 (3) | 9 | 10 | 11 | 12 | 13 | 14 | 15 | 16 | 17 |
| W+4=13 (4) | 9 | 10 | 11 | 12 | 13 | 14 | 15 | 16 | 17 |
| W+5=14 (5) | 9 | 10 | 11 | 12 | 13 | 14 | 15 | 16 | 17 |
| W+6=15 (6) | 9 | 10 | 11 | 12 | 13 | 14 | 15 | 16 | 17 |
| W+7=16 (7) | 9 | 10 | 11 | 12 | 13 | 14 | 15 | 16 | 17 |
| W-1=8 (8) | 9 | 10 | 11 | 12 | 13 | 14 | 15 | 16 | 17 |

Table 400d

| PSD(row) | 0 | 1 | 2 | 3 | 4 | 5 | 6 | 7 | 8 |
|---|---|---|---|---|---|---|---|---|---|
| 18 (0) | 18 | 18 | 18 | 18 | 18 | 18 | 18 | 18 | 0 |
| 1 (1) | 1 | 2 | 3 | 4 | 5 | 6 | 7 | 8 | 0 |
| 2 (2) | 2 | 3 | 4 | 5 | 6 | 7 | 8 | 0 | 1 |
| 3 (3) | 3 | 4 | 5 | 6 | 7 | 8 | 0 | 1 | 2 |
| 4 (4) | 4 | 5 | 6 | 7 | 8 | 0 | 1 | 2 | 3 |
| 5 (5) | 5 | 6 | 7 | 8 | 0 | 1 | 2 | 3 | 4 |
| 15 (6) | 6 | 7 | 8 | 0 | 1 | 2 | 3 | 4 | 5 |
| 16 (7) | 7 | 8 | 0 | 1 | 2 | 3 | 4 | 5 | 6 |
| 17 (8) | 8 | 0 | 1 | 2 | 3 | 4 | 5 | 6 | 7 |
| 0 (9) | 0 | 1 | 2 | 3 | 4 | 5 | 6 | 7 | 8 |

FIG. 19B

EXPANDING RAID SYSTEMS

BACKGROUND

Technical Field

The subject matter of this disclosure is generally related to electronic data storage, and more particularly to increasing the storage capacity of a data storage system that implements protection groups.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (I/O) operations utilizing a physical storage device of the storage system, one or more components of the host system, storage system and network components therebetween may be used. The one or more combinations of components of the host, switching fabric and storage system over which I/O operations between an application and the storage system may be communicated may be considered an I/O path between the application and the storage system. It should be appreciated that other combinations of components of a storage network, for example, two or more storage systems, also may be coupled together by one or more switches of a switching fabric. Thus, more generically, the one or more combinations of components of a first network component, switching fabric and second network component over which I/O communications may be communicated may be considered an I/O path between the two network components. The collective I/O paths between components of a storage network may be considered to define a connectivity of the storage network.

Host systems may not address the physical storage devices of a storage systems directly, but rather access to data may be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In an embodiment of the invention, a method of configuring protection groups for physical storage devices of a storage system is performed. The method includes: partitioning each of a first quantity (W) of physical storage device into W partitions; creating a first matrix including W columns and W rows, each row representing one of the W physical storage devices and each column representing one of the W partitions of each of the W physical storage devices; using the first matrix to assign, for each of the W physical storage devices, a different one of W protection groups to each of the W partitions of the physical storage device; adding a second quantity (N) of physical storage devices to the storage system, wherein N<W, to produce a third quantity (T=W+N) of physical storage devices; partitioning each of the N physical storage devices into W partitions; adding N protection groups to the W protection groups to produce T protection groups; expanding the first matrix to accommodate T physical storage devices and T protection groups; assigning the T protection groups to the W partitions of each of the T physical storage devices based on the expanded matrix; and, based on the assigning, moving data from at least a first of the W partitions on at least a first of the T physical devices to at least a second of the W partitions on at least a second of the T physical devices. The assigning of the T protection groups may assign, for each of the T physical storage devices, a different one of T protection groups to each of the W partitions of the physical storage device, including re-assigning only W*(W−N) protection groups from a respective first of W partitions for a first of the W physical storage devices to a respective second of W partitions for a second of the T physical storage devices, and the method further may include moving only data of the W*(W−N) protection groups according to the re-assigning. Expanding the first matrix may include: adding N rows to the W rows of the first matrix to produce T rows; and transposing N columns from a fifth quantity (X=W−N) of the W rows to X columns of the added N rows. Expanding the first matrix may include, before the transposing, swapping positions of the added N rows in the first matrix with positions of rows 0 through [N−1] in the matrix. The method further may include: after adding the N physical storage devices to the storage system, adding a sixth quantity (O) of physical storage devices to the storage system to produce a seventh quantity (T+O) of physical storage devices; partitioning each of the added O physical storage devices into W partitions; adding O protection groups to the T protection groups to produce T+O protection groups; further expanding the first matrix to accommodate the O new physical storage devices, including: adding O rows to the T rows of the first matrix, and transposing W rows from O columns to the added O rows; and assigning the T+O protection groups to the W partitions of each of the T+O physical storage devices based on the further expanded matrix. The method further may include: after adding the N physical storage devices to the storage system, adding a sixth quantity (O) of physical storage devices to the storage system to produce a seventh quantity (T+O) of physical storage devices; partitioning each of the added O physical storage devices into W partitions; adding O protection groups to the T protection groups to produce T+O protection groups; determining if T+O>2*W; if T+O>2*W, splitting the expanded first matrix into a second matrix and a third matric matrix; and assigning the T+O protection groups to the W partitions of each of the T physical storage devices based on the second matrix and the third matrix. The expanding of the first matrix into a second matrix and a third matric matrix may include: configuring the second matrix to have vertically-aligned protection group assignments not subject to change in response to further additions of physical storage devices to the storage system; and configuring the third matrix to have diagonally-aligned protection group assignments subject to change in response to further additions of physical storage devices to the storage system.

In another embodiment of the invention, a system for configuring protection groups for physical storage devices of a storage system includes executable logic that implements a method including: partitioning each of a first quantity (W) of physical storage device into W partitions; creating a first matrix including W columns and W rows, each row representing one of the W physical storage devices and each column representing one of the W partitions of each of the W physical storage devices; using the first matrix to assign, for each of the W physical storage devices, a different one of W protection groups to each of the W partitions of the physical storage device; adding a second quantity (N) of physical storage devices to the storage system, wherein N<W, to produce a third quantity (T=W+N) of physical storage devices; partitioning each of the N physical storage devices into W partitions; adding N protection groups to the W protection groups to produce T protection groups; expanding the first matrix to accommodate T physical storage devices and T protection groups; assigning the T protection groups to the W partitions of each of the T physical storage devices based on the expanded matrix; and based on the assigning, moving data from at least a first of the W partitions on at least a first of the T physical devices to at least a second of the W partitions on at least a second of the T physical devices. The assigning of the T protection groups may assign, for each of the T physical storage devices, a different one of T protection groups to each of the W partitions of the physical storage device, including re-assigning only W*(W−N) protection groups from a respective first of W partitions for a first of the W physical storage devices to a respective second of W partitions for a second of the T physical storage devices, and the method further may include moving only data of the W*(W−N) protection groups according to the re-assigning. Expanding the first matrix may include: adding N rows to the W rows of the first matrix to produce T rows; and transposing N columns from a fifth quantity (X=W−N) of the W rows to X columns of the added N rows. Expanding the first matrix may include, before the transposing, swapping positions of the added N rows in the first matrix with positions of rows 0 through [N−1] in the matrix. The method further may include: after adding the N physical storage devices to the storage system, adding a sixth quantity (O) of physical storage devices to the storage system to produce a seventh quantity (T+O) of physical storage devices; partitioning each of the added O physical storage devices into W partitions; adding O protection groups to the T protection groups to produce T+O protection groups; further expanding the first matrix to accommodate the O new physical storage devices, including: adding O rows to the T rows of the first matrix, and transposing W rows from O columns to the added O rows; and assigning the T+O protection groups to the W partitions of each of the T+O physical storage devices based on the further expanded matrix. The method further may include: after adding the N physical storage devices to the storage system, adding a sixth quantity (O) of physical storage devices to the storage system to produce a seventh quantity (T+O) of physical storage devices; partitioning each of the added O physical storage devices into W partitions; adding O protection groups to the T protection groups to produce T+O protection groups; determining if T+O>2*W; if T+O>2*W, splitting the expanded first matrix into a second matrix and a third matric matrix; and assigning the T+O protection groups to the W partitions of each of the T physical storage devices based on the second matrix and the third matrix. The expanding of the first matrix into a second matrix and a third matric matrix may include: configuring the second matrix to have vertically-aligned protection group assignments not subject to change in response to further additions of physical storage devices to the storage system; and configuring the third matrix to have diagonally-aligned protection group assignments subject to change in response to further additions of physical storage devices to the storage system.

In another embodiment of the invention, a computer-readable media has software stored thereon defining a method of configuring protection groups for physical storage devices of a storage system. The software includes: executable code that controls partitioning each of a first quantity (W) of physical storage device into W partitions; executable code that controls creating a first matrix including W columns and W rows, each row representing one of the W physical storage devices and each column representing one of the W partitions of each of the W physical storage devices; executable code that controls using the first matrix to assign, for each of the W physical storage devices, a different one of W protection groups to each of the W partitions of the physical storage device; executable code that controls adding a second quantity (N) of physical storage devices to the storage system, wherein N<W, to produce a third quantity (T=W+N) of physical storage devices; executable code that controls partitioning each of the N physical storage devices into W partitions; executable code that controls adding N protection groups to the W protection groups to produce T protection groups; executable code that controls expanding the first matrix to accommodate T physical storage devices and T protection groups; executable code that controls assigning the T protection groups to the W partitions of each of the T physical storage devices based on the expanded matrix; and executable code that controls, based on the assigning, moving data from at least a first of the W partitions on at least a first of the T physical devices to at least a second of the W partitions on at least a second of the T physical devices. The assigning of the T protection groups may assign, for each of the T physical storage devices, a different one of T protection groups to each of the W partitions of the physical storage device, including re-assigning only W*(W−N) protection groups from a respective first of W partitions for a first of the W physical storage devices to a respective second of W partitions for a second of the T physical storage devices, and the software further may include executable code that controls moving only data of the W*(W−N) protection groups according to the re-assigning. Expanding the first matrix may include: adding N rows to the W rows of the first matrix to produce T rows; and transposing N columns from a fifth quantity (X=W−N) of the W rows to X columns of the added N rows. Expanding the first matrix may include, before the transposing, swapping positions of the added N rows in the first matrix with positions of rows 0 through [N−1] in the matrix. The software further may include: executable code that controls, after adding the N physical storage devices to the storage system, adding a sixth quantity (O) of physical storage devices to the storage system to produce a seventh quantity (T+O) of physical storage devices; executable code that controls partitioning each of the added O physical storage devices into W partitions; executable code that controls adding O protection groups to the T protection groups to produce T+O protection groups; executable code that controls further expanding the first matrix to accommodate the O new physical storage devices, including: adding O rows to the T rows of the first matrix, and transposing W rows from O columns to the added O rows; and assigning the T+O protection groups to the W partitions of each of the T+O physical storage devices based on the further expanded matrix. The software further may include:

executable code that controls, after adding the N physical storage devices to the storage system, adding a sixth quantity (O) of physical storage devices to the storage system to produce a seventh quantity (T+O) of physical storage devices; executable code that controls partitioning each of the added O physical storage devices into W partitions; executable code that controls adding O protection groups to the T protection groups to produce T+O protection groups; executable code that controls determining if T+O>2*W; executable code that controls, if T+O>2*W, splitting the expanded first matrix into a second matrix and a third matric matrix; and executable code that controls assigning the T+O protection groups to the W partitions of each of the T physical storage devices based on the second matrix and the third matrix.

BRIEF DESCRIPTION OF THE DRAWINGS

Features and advantages of the present invention will become more apparent from the following detailed description of illustrative embodiments thereof taken in conjunction with the accompanying drawings in which:

FIG. 2 is a flowchart illustrating a method of managing protection group membership for a protection group cluster, according to embodiments of the invention;

FIG. 3 is a flowchart illustrating a method of initially configuring protection group membership for a protection group cluster, according to embodiments of the invention;

FIG. 4 illustrates an example of a protection group matrix, according to embodiments of the invention.

FIG. 5 is a flowchart illustrating a method of reconfiguring protection group membership for a protection group cluster in response to one or more physical storage devices being added to the cluster, according to embodiments of the invention;

FIGS. 6-10B illustrate examples of modifying a protection group matrix, according to embodiments of the invention;

FIGS. 13-19B illustrate examples of modifying a protection group matrix, according to embodiments of the invention;

DETAILED DESCRIPTION OF EMBODIMENTS

Figure 1:
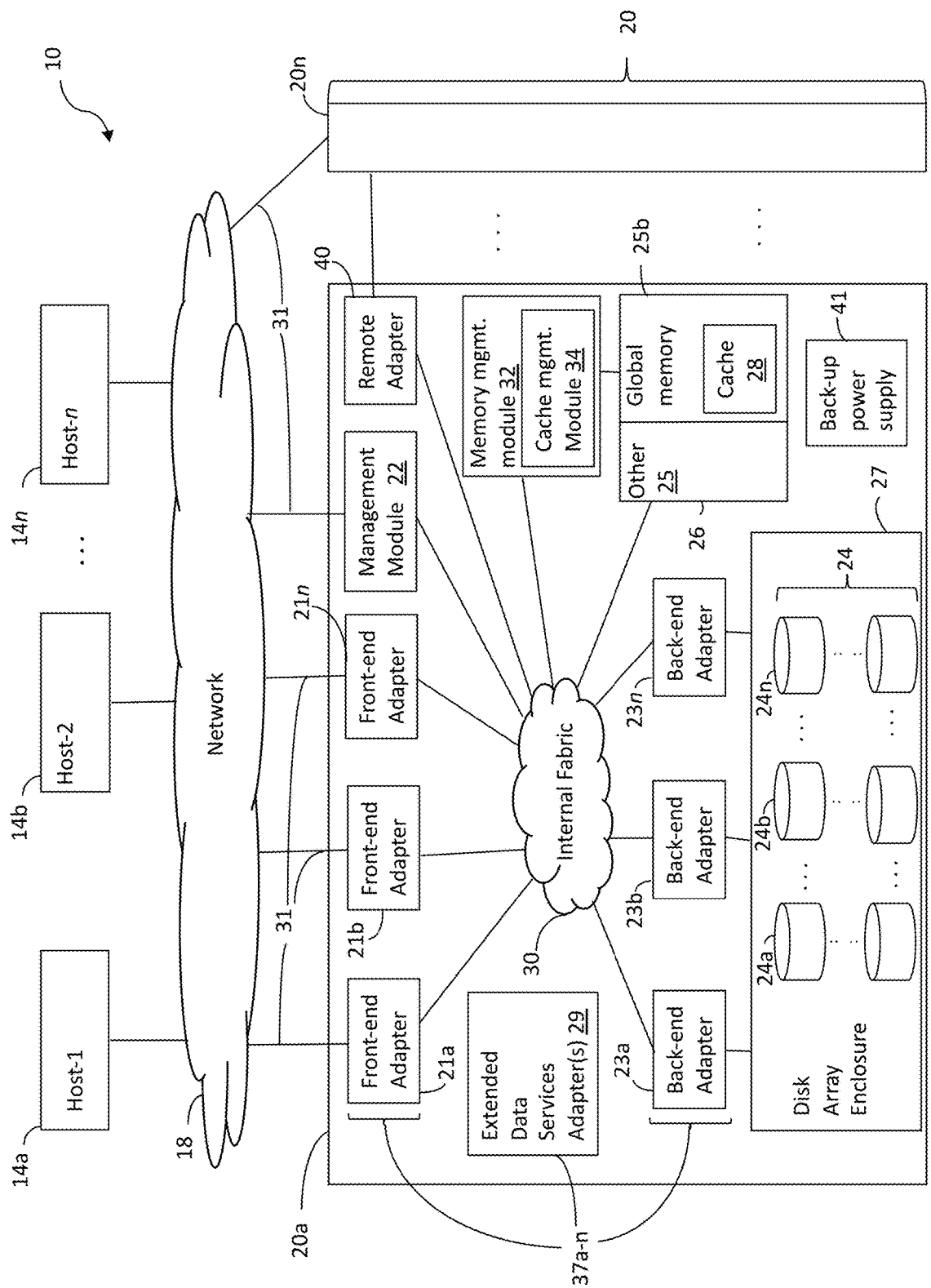
FIG. 1 is a block diagram illustrating an example of a data storage network, according to embodiments of the invention.

Protection groups help to avoid data loss by enabling a failed member of the protection group to be reconstructed. For example, the physical storage devices (PSDs, e.g., disk drives, flash drives) of a storage system may be organized as members of a redundant array of independent disks (RAID) protection group, which may be referred to herein as a "RAID group." A RAID group may be expressed in terms of its RAID level (e.g., 0-6, 10), for example, "RAID-0" or "RAID-6," and/or in terms of its number of data members (D) and parity members (P); i.e., as a RAID (D+P) group.

For example, a RAID group may be expressed as a RAID (8+1) group, or a RAID (4+1) group. The data members store data. The parity members store parity information such as XORs of data values. The parity information enables reconstruction of data in the event that a data member fails, and can be reconstructed from the data on the data members in the event that a parity member fails. The term "W" may be used herein to refer to the total number of members (i.e., the "width") of a protection group; i.e., W=D+P.

It is sometimes desirable to increase the total storage capacity of a storage system, for example, because the storage capacity of the existing storage system is nearing full consumption and/or because a need for more storage capacity has been forecasted. Some storage systems use individual PSDs as protection group members; that is, each PSD is a protection group member. In such storage systems, storage capacity of the storage system may be increased by adding a new protection group, i.e., W PSDs for a RAID (D+P) protection group. For example, a storage system that implements RAID-5 (4+1) may be scaled-up in increments of five new PSDs per upgrade. Similarly, a RAID group having four members may be scaled-up in increments of four new PSDs. One potential drawback of scaling storage capacity in increments of W new PSDs is that it may introduce excess storage capacity that will not be utilized within a reasonable timeframe. This potential drawback is becoming more troublesome as the storage capacity of individual PSDs increases due to technological advancements. More specifically, as the storage capacity and cost of PSDs increases, the amount of excess storage capacity and cost associated with adding W PSDs to a storage system also increase, particularly for larger values of W.

To address the potential drawbacks described above, rather than each PSD being a member of a protection group, a virtualized protection scheme may be employed in which a group of PSDs of a data storage system may be divided into a plurality of partitions (i.e., slices), where each partition is a contiguous sequential set of logical or physical block addresses of a physical device, and each partition may be a member of a protection group, e.g., a RAID group. That is, unlike conventional RAID systems in which the members of the RAID group are discrete PSDs in their entireties, in embodiments herein, the members of a RAID group, or another type of protection group, may be partitions of PSDs.

In some embodiments, a plurality of PSDs of a storage system may be grouped together in what may be referred to herein as a "protection group cluster" (PGC; e.g., a "RAID cluster") that includes a plurality of protection groups (e.g., RAID groups). Each PSD of the PGC may be divided into plurality of partitions, and each protection group may be defined to include partitions from different PSDs. That is, the members of each protection group are partitions of PSDs. For example, a PGC may include 7 PSDs, and each PSD may be divided into 5 partitions, for a total of 35 partitions. Six protection groups may be defined, where the members of each protection group may be defined to include a combination of the 35 partitions.

In some embodiments, it may be desirable or required (e.g., by a protection group technology (e.g., RAID), that one or more of the following conditions be met: 1) the number of protection groups of a PGC is equal to the number of PSDs in the PGC; 2) each PSD is divided into the same number of partitions; 3) the size of each partition is the same; 4) each partition of a PSD is assigned as a member of one and only one protection group; 5) each partition of a PSD is assigned as a member of a different protection group; 6) each protection group includes the same number of members (partitions); 7) the number of members (partitions) of each protection group (W) is the same; and 8) the number of partitions of each PSD is the same as the number of number of protection groups. If the foregoing conditions are met, the cumulative storage capacity of each protection group of the PGC is the same as the storage capacity of each PSD.

In some embodiments, when a PGC is initially configured, all of the above 8 conditions may be met. After initial configuration, it may be necessary or desirable to increase a storage capacity of the storage system by adding PSDs, in which case PSDs may be added to the PGC. It may be desirable to still meet the above 8 conditions to the extent possible when the PSDs are added to the PGC. In some embodiments, it may be possible to meet conditions 1-7 by re-assigning partitions as members to other protection groups. However, such re-assignment results in the moving of data from the re-assigned partition, which consumes time and resources of the storage system Thus, it may be desirable to minimize the number of partitions that are re-assigned to another protection group of a PGC as a result of one or more PSDs being added to a PGC, for example, while still maintaining conditions 1-7 above, and condition 8 to the extent possible.

Described herein are techniques for minimizing the number of partitions that are re-assigned to another protection group of a PGC as a result of one or more PSDs being added to a PGC, for example, while still maintaining conditions 1-7 above, and condition 8 to the extent possible.

In some embodiments, the plurality of PSDs of the PGC may be represented by a matrix having a plurality of rows and a plurality of columns, where each row corresponds to a PSD of the PGC, and each column corresponds to a partition of each PSD. The value specified in each cell at an intersection of a row and column specifies the protection group of the PGC to which the partition of the PSD represented by the column and row, respectively, is (or will be) assigned. Such a matrix may be referred to herein as a protection group matrix (PGM). A PGC initially may be configured such that the 8 conditions above are met, including that the initial number of members (W) of each protection group equals the number of PSDs and the number of partitions of each PSD, such that each of: the number of cells of the PGM specifying each protection group; the number of columns of the PGM; and the number of rows of the PGM are initially set equal to W. Further, the PGM may be initially configured such that each row and each column of the PGM include a cell specifying each protection group. That is, every protection group may be assigned exactly one member per row and per column.

In some embodiments, a PGM may be initially configured so that not only does each row and each column of the PGM include a cell specifying each protection group, but each row and each column specifies the protection groups in a same predefined (e.g., numerical) order and the protection group identifiers diagonally align, as described and illustrated in more detail herein. Such a configuration of a PGM may be referred to herein as a symmetrical configuration, and the PGM so configured as a symmetrical PGM. The symmetrical configuration may facilitate minimizing a number of PSDs that are re-assigned to other protection groups as a result of one or more of PSDs being added to a PGC, as described in more detail elsewhere herein.

In response to one or more of PSDs being added to a PGC, the PGM may be manipulated (i.e., reconfigured), including adding new rows, and transposing portions of columns to the new rows, or transposing portions of rows to portions of columns of the new rows, as described in more detail elsewhere herein. In some embodiments, one or both of two different processes may be employed as part of reconfiguring the PGM. In a first process, which may be referred to herein "the linear process," a number of rows (N) equal to the number of added PSDs may be added to the PGM, and at least a portion of N columns of the PGM may be transposed to the added N rows, and each cell of the vacated portions of the N columns may be assigned to one of N protection groups created as a result of the N PSDs being added to the PGC. The linear process is described in more detail elsewhere herein.

The linear process may be repeated for each future addition of PSDs to a PGC following the initial configuration of the PGM as describe in more detail elsewhere herein In some embodiments, a second process, which may be referred to herein as "the pivoting process," may be employed as part of reconfiguring the PGM in response to first N PSDs being added to a PGC. The pivoting process may include adding a number of rows (N) equal to the number of added PSDs are added to the PGM. The position of the added N rows (the last N rows of the PGM) then may be swapped with the position of the first N rows, while remaining middle rows N-[W−1] remain in place. That is, the added rows N and first N rows may be pivoted about the middle rows. The rows N-[W−1] of columns 0-[N−1] may then be transposed to columns N-[W−1] of rows 0-[N−1], as described in more detail elsewhere herein. Each cell of the vacated portions of the N-[W−1] middle rows may be assigned to one of the N new protection groups created as a result of the N PSDs being added to the PGC. The pivoting process is described in more detail elsewhere herein.

In some embodiments, the pivoting process may only be performed for a first addition of N (<W) PSDs to a symmetrical PGC with W PSDs, and the linear process may be performed for a next addition of N (<W) PSDs to a non-symmetrical PGC with T PSDs, where T+N≤2*W.

The term "T" may be used herein to refer to the total number of PSDs (and thus protection groups) of a PGC; i.e., the total number of rows of a PGM. Initially, when the PGM is initialized, T may be set equal to the initial number of PSDs, protection groups and rows; i.e., T=W. Each time N PSDs are added to the PGC and N rows are added to the PGM, T may be incremented by N; i.e., T=T+N.

For any additions of N (<W) PSDs to a PGC after a first addition of N (<W) PSDs to the PGC, it may be determined if T+N>2*W. If T+N>2*W, a two-step process may be performed. The linear process may be performed for the addition of K PSDs to the PGM (where K=2*W−T); specifically on cols. [T]-[2*W−1] of rows [0]-[W−1] for the added PSDs [T]-[2*W−1]. The PGM then may be split into two PGMs, for example, a symmetrical PGM and a non-symmetrical PGM, each representing W PSDs with W rows, as described in more detail elsewhere herein. The pivoting process may be performed on the new symmetrical PG matrix for the addition of the new N−K PSDs; i.e., for the new PSDs [T−(2*W)]-[T+N−1]. Future additions of N (<W) PSDs to the new symmetrical PGM may be performed in accordance with the methods described herein.

As should be apparent from more detailed descriptions herein, given the original number of PSDs and protection groups represented by the initial PGM (as indicated by the number of rows and cell assignments to each protection group)=W, for a first addition of N (<W) PSDs to the PGC, performing the linear process will result in N*W members (partitions) being re-assigned, and the thus the data of the N*W members being moved. In what may be considered a worst case scenario for a first addition of N (<W) PSDs, N=W−1, performing the linear process will result in (W−1)*W members (partitions) being re-assigned, and the thus the data of the (W−1)*W members being moved. Adding W−1 may be considered a worst case scenario, because if N>W, then a new PGC may be created for each multiple of W PSDs. For such new PGCs, no members have re-assigned and thus no data moved, as all protection groups will of such PGCs will be new. New symmetrical PGMs may be created for each new PGC, and the new PGMs may be manipulated to add new PSDs using the techniques described herein.

As will become apparent from more detailed descriptions herein, given the original number of PSDs and protection groups represented by the initial PGM (as indicated by the number of rows and cell assignments to each protection group)=W, for a first addition of N (<W) PSDs to the PGC, performing the pivoting process will result in N*(W−N) members (partitions) being re-assigned, and the thus the data of the N*(W−N) members being moved. In what may be considered a best case scenario for a first addition of N (<W) PSDs, N=W−1, performing the pivoting process will result in (W−1) members (partitions) being re-assigned, and the thus the data of the W−1 members being moved.

For a first addition of N (<W) PSDs to a PGC, the pivoting process reduces the number of protection group members that need to be reassigned and have their data moved when the linear process is used, from NW to N(W−N), which amounts to $N^2/W$ PSDs' worth of data. The more data movement that performing the linear process would require, the more reduction the pivoting process will provide. As noted elsewhere herein, the worst case scenario for data movement when using the linear process would be when adding (W−1) PSDs, whereas adding W−1 is the best case scenario when using the pivoting process, with data movement reduced from (W−1) PSDs to (W−1) protection group members, i.e., slightly less than 1 PSD.

Assuming N may be any number from 1 to W−1, the average data reduction from performing the pivoting process instead of the linear process should be:

$$SUM(N^2/W)/(W-1)=((W-1)W(2W-1)/(6W))/(W-1)=(2W-1)/6$$

For the addition of N (<W) PSDs to a PGC using the linear process, the original average data movement should be:

$$SUM(N)/(W-1)=(W(W-1)/2)/(W-1)=W/2$$

The ratio of reduction when using the pivoting process in place of the linear process for the addition of N (<W) PSDs should be:

$$((2W-1)/6)/(W/2)=\tfrac{2}{3}-1/(3W)$$

This reduction ratio is nearly ⅔. For RAID (8+1), W=9, the average should be reduced by almost 3 PSDS from the original average of 4.5 disks.

In addition to reducing system load, embodiments of the invention, for example, the pivoting process, should also speed up system expansion. Expansion completion time should be linearly proportional to the amount of data written per new PSD, i.e. (W−N) members. The linear process should result in writing W members to every new PSD. Therefore, the pivoting process should be W/(W−N) times faster. In the best case, N=(W−1), the pivoting process should be W times faster than the linear process. In an average case where N=W/2, the pivoting process should be twice as fast.

It should be appreciated that, while embodiments described herein are described in relation to RAID technology, including RAID groups and RAID clusters, other type of protection technology, including other types of protection groups and protection clusters may be used, and are intended to fall with the scope of the invention.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a switching fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and inter-connected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more front-end adapters ("FAs") 21a-n (e.g., directors configured to serve as FAs), which also may be referred to herein as host adapters ("HAs"). Each of these FAs may be used to manage communications and data operations between one or more host systems and global memory (GM) 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

The storage system 20a also may include one or more extended data service adapters 29 (EDSs) which are directors configured to serve as EDSs. An EDS may perform various data services, for example, including such services or processing in connection with facilitating other processing performed by BEs and FAs. For example, an EDS may perform processing that manages metadata tables of information used by other directors such as BEs in connection with I/O operations, data deduplication, and the like.

Storage system 20a also may include a management module 22, which may be configured (e.g., dedicated) to perform storage management functions or services such as, for example, storage provisioning, device configuration, tier management, other services, or any combination of other services. The management module 22 also may be configured to perform, or assist in performing analysis such as, for example, performance and/or utilization analysis and/or forecasting of system behavior, the result of which may inform other management functions performed by the management module 22. The management module 22 may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n, as an independent management server, or as part of another separate system connected to storage system 20a via network 18. In some embodiments, the management and analysis functions described herein may be performed using both resource of the management module 22 of the storage system 20a and one management resources located externally to the storage system, for example, on a host system, management server and/or other components.

The FAs, BEs, EDSs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing I/O operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, EDSs 29, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs, EDSs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

The memory 26 may include persistent memory for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof—e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

The storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, EDS, BE, FA and the like), techniques herein may be performed in a physical storage system including one or more emulated or virtualized components (e.g., emulated or virtualized ports, emulated or virtualized EDSs, BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Any of storage systems 20a-n, or one or more components thereof, described in relation to FIG. 1 may be implemented using one or more Symmetrix™, VMAX™, VMAX3™ or PowerMax™ systems made available from Dell EMC.

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

In some embodiments of the invention, protection group assignments of protection group clusters (PGCs) may be managed, for example, as will now be described.

FIG. 2 is a flowchart illustrating a method 200 of managing protection group membership for a PGC, according to embodiments of the invention. Other embodiments of a method of managing protection group membership for a PGC, for example, variations of the method 200, are possible, and are intended to fall within the scope of the invention. The method 200 may be implemented by any of the directors 37a-n, for example, EDS adapter 29, and/or management module 22, or another component or logic residing on the storage system 20a or external thereto.

In a step 202, protection groups of a PGC may be initially configured for W PSDs designated as members of the PGC, for example, by performing the method 300 described in relation to FIG. 3. The W PSDs may be at least a subset of the PSDs available on a storage system, for example, at least a subset of the PSDs 24 of the storage system 20a.

FIG. 3 is a flowchart illustrating a method of initially configuring protection group membership for a PGC, according to embodiments of the invention. Other embodiments of a method of initially configuring protection group membership for a PGC, for example, variations of the method 300, are possible, and are intended to fall within the scope of the invention.

In a step 302, each of the W PSDs may be partitioned into W partitions. In a step 304, W partitions of each of the W PSDs may be assigned as members to W protection groups, for example, in satisfaction of the 8 conditions described above. For example, a protection group matrix (PGM) may be created for the PGC, and the W partitions of each of the W PSDs assigned per the PGM. In some embodiments, the performance of the step 304 assigns the members of a protection group G to locations at row R, column C of a PGM according to the formula G=(R+C) modulo W.

FIG. 4 illustrates an example of a PGM 400, according to embodiments of the invention. Other type of data structures, other than a matrix, may be used in embodiments of the invention. The PGM 400 may be, for example, for a PGC where each protection group has a RAID (8+1) (W=9) protection scheme, i.e., each protection group includes W members. The PGM 400 includes W rows 404 and W columns 402, where each of the rows 404 corresponds to a PSD of the PGC, and each of the columns 402 corresponds to a partition of each PSD. In FIG. 4, the position of each row in the PGM correlates to a PSD reference of the PSD it represents relative to the references of other PSDs of the PGC. As is described in detail elsewhere herein, such correlation may not always be the case, for example, when rows are pivoted as part of the pivoting process described in more detail elsewhere herein. The value specified in each cell at an intersection of a row and a column specifies the protection group of the PGC to which the partition of the PSD represented by the column and row, respectively, is (or will be) assigned. For example, column 3 of row 4 indicates that partition 3 of PSD 4 is assigned to protection group 7, and column 5 of row 0 indicates that partition 5 of PSD 0 is assigned to protection group 5.

A PGC initially may be configured using the PGM 400 such that the 8 conditions described elsewhere herein are met, including that the initial number of members (W) of each protection group equals the number of PSDs and the number of partitions of each PSD, such that each of: the number of cells of the PGM specifying each protection group; the number of columns of the PGM; and the number of rows of the PGM are initially set equal to W. As is illustrated in FIG. 4, the PGM has W=9 rows (0-8), 9 columns (0-8) and 9 cells specifying each protection group 0-8. Further, the PGM may be initially configured such that each row and each column of the PGM include a cell specifying each protection group. That is, every protection group may be assigned exactly one member per row and per column. As is clear from a visual inspection of PGM 400, every protection group 0-8 is assigned exactly one member per row (0-8) and per column (0-8).

In some embodiments, a PGM may be initially configured so that not only does each row and each column of the PGM include a cell specifying each protection group, but each row and each column specifies the protection groups in a same predefined (e.g., numerical) order, and the protection group identifiers diagonally align, as described and illustrated in more detail herein. Such a configuration of a PGM may be referred to herein as a symmetrical configuration, and the PGM so configured as a symmetrical PGM. Each of the rows 404 and columns 402 of the PGM 400 specify the protection groups 0-8 in numerical order 0 to 8, returning to 0 when 8 is reached. Further, as illustrated by the various dashed diagonal lines and from visual inspection, the protection group assignments diagonally align. Accordingly, the PGM 400 may be considered a symmetrical PGM. Such a symmetrical configuration may facilitate minimizing a number of PSDs that are re-assigned to other protection groups as a result of one or more of PSDs being added to a PGC, as should become more apparent from the following description.

Is a step 306, a variable T representing the total number PSDs of a PGC may be set to W, the initial number of PSDs in the PGC.

Returning to FIG. 2, in a step 204, N new PSDs may be added to the PGC, where N may be 1 or greater. While N can be a number greater than W, embodiments of the invention described herein are described primarily for the case when N<W. For example, N PSDs may be added to the storage system and designated for inclusion in the PGC. It should be appreciated that the step 204 may happen days, weeks, months or even years after the performance of the step 202, or perhaps never at all.

In a step 206, each of the N added PSDs may be divided into W partitions, after which re-assignment of protection group members may be determined, for example, by performance of a step 208. In the step 208, the PGM created in the step 304 may be reconfigured to accommodate the added N PSDs, and in a step 210, partitions of PSDs may be re-assigned based on the reconfigured PGM. As a result of partitions being reassigned, data of the re-assigned partitions may be moved.

In a step 212, T may be incremented by N; i.e., T=T+N. At some later point in time, more PSDs may be added to a storage system and designated for addition to the PGC, and steps 204-212 may be performed again.

In some embodiments, the step 210 of the method 200 may be implemented by performing a method 500 described in relation to the FIG. 5, which includes using only the linear process as described herein. In other embodiments, the step 210 may be implemented by performing a method 1100 described in relation to the FIG. 11, including using the pivoting process as described herein and, in some cases, the linear process in addition thereto.

FIG. 5 is a flowchart illustrating the method 500 of reconfiguring protection group membership for a PGC in response to one or more PSDs being added to the cluster, according to embodiments of the invention. Other embodiments of a method of reconfiguring protection group membership for a PGC in response to one or more PSDs being added to the cluster, for example, variations of the method 500, are possible, and are intended to fall within the scope of the invention.

In a step 502, it may be determined whether T+N≥2*W for the PGC. For a first addition of N (<W) PSDs to the PGC since being initially configured, the answer should be negative, and the method 500 should proceed to the linear process 503, which may include steps 504, 506 and 508. In a step 504, N rows, specifically rows [T] to [T+N-1], may be added to the PGM. For example, FIG. 6 illustrates an example of performing the step 504 on the PGM 400 when W=9 and N=6, in which N rows 606 have been added to the PGM 400. The example of FIG. 6 illustrates a first addition of N (<W) PSDs to the PGC since being initially configured, such that T=W=9.

In a step 506, the columns [T-W] to [T-W+N-1] of rows 0 to [W-1] may be transposed to rows [T]-[T+N-1]. For example, the step 506 may implement the following transposition:

for (i=0; i<N; i++)
for (j=0; j<W; j++)
{PSD [W+i]. partition [j]=PSD [j]. partition [i]}

Figure 7:
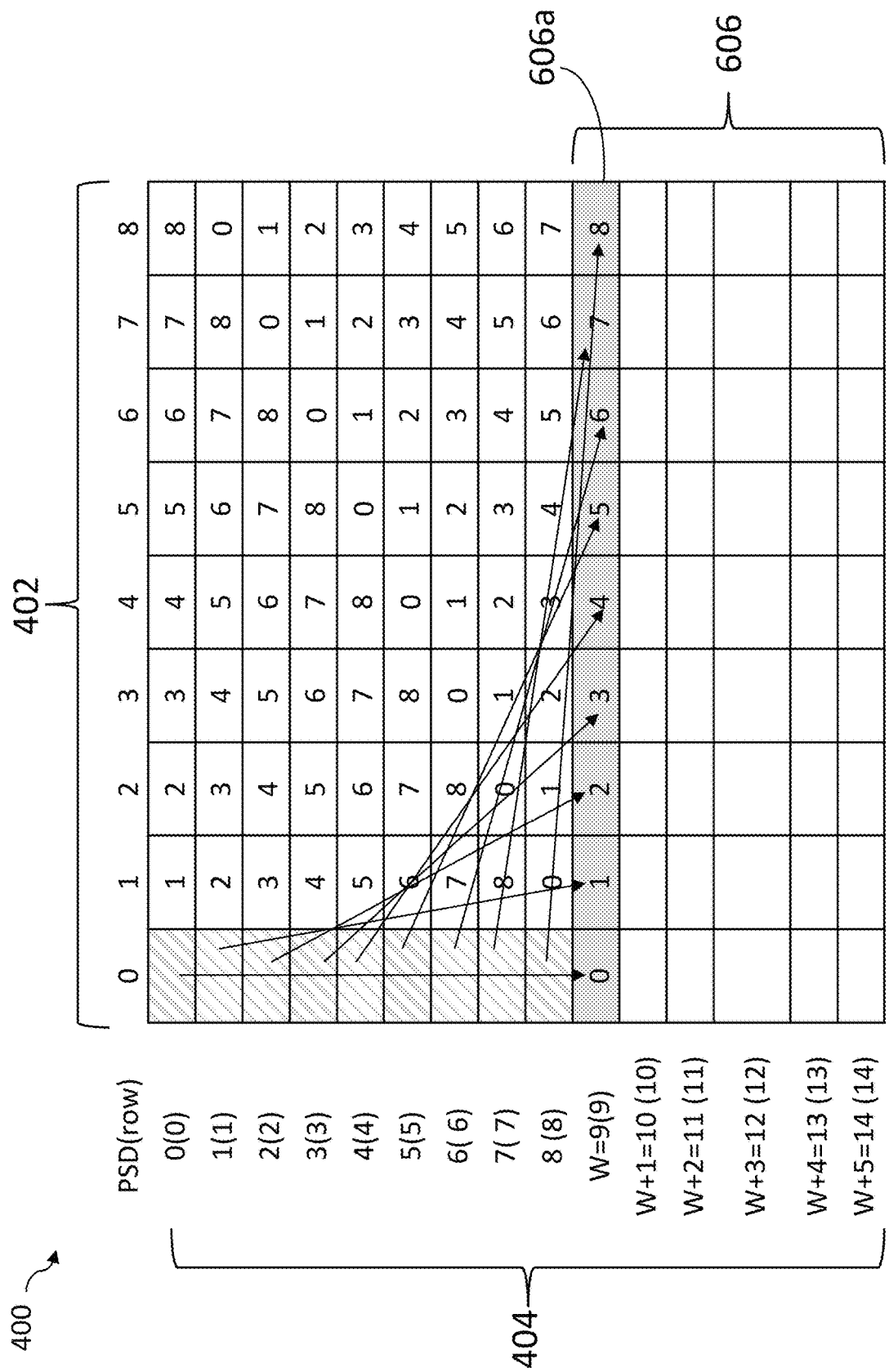

FIG. 7 illustrates an example of performing part of the transposition of the step 506 on the PGM 400 when T=W=9 and N=6, i.e., the transposition of column 0, rows 0-8 to row T 606a.

Figure 8:
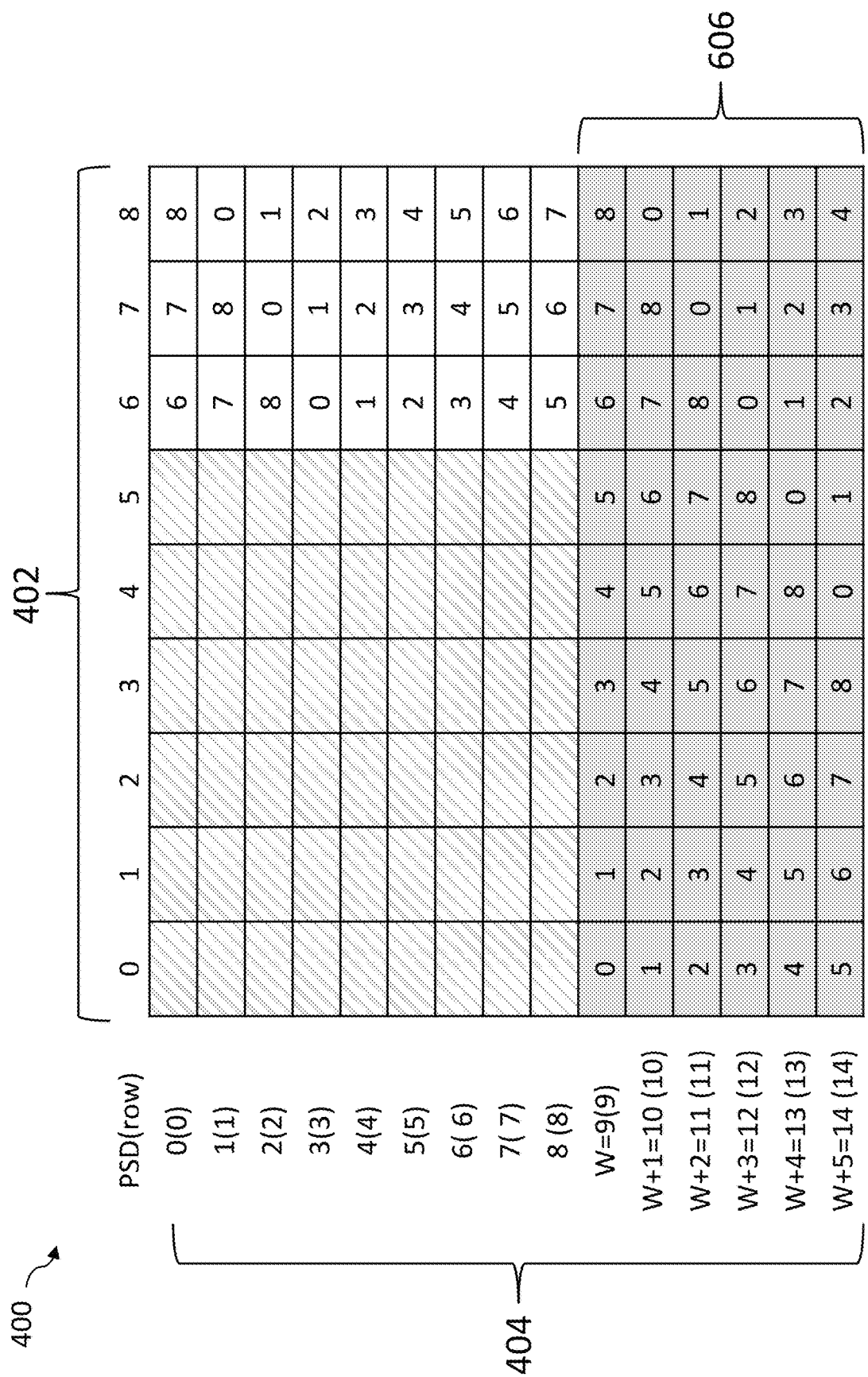

FIG. 8 illustrates an example of the complete performance of the transposition of the step 506 when T=W=9 and N=6; i.e., the transposition of the columns [T-W] to [T-W+N-1] of rows 0 to [W-1] to rows [T]-[T+N-1].

Figure 9:
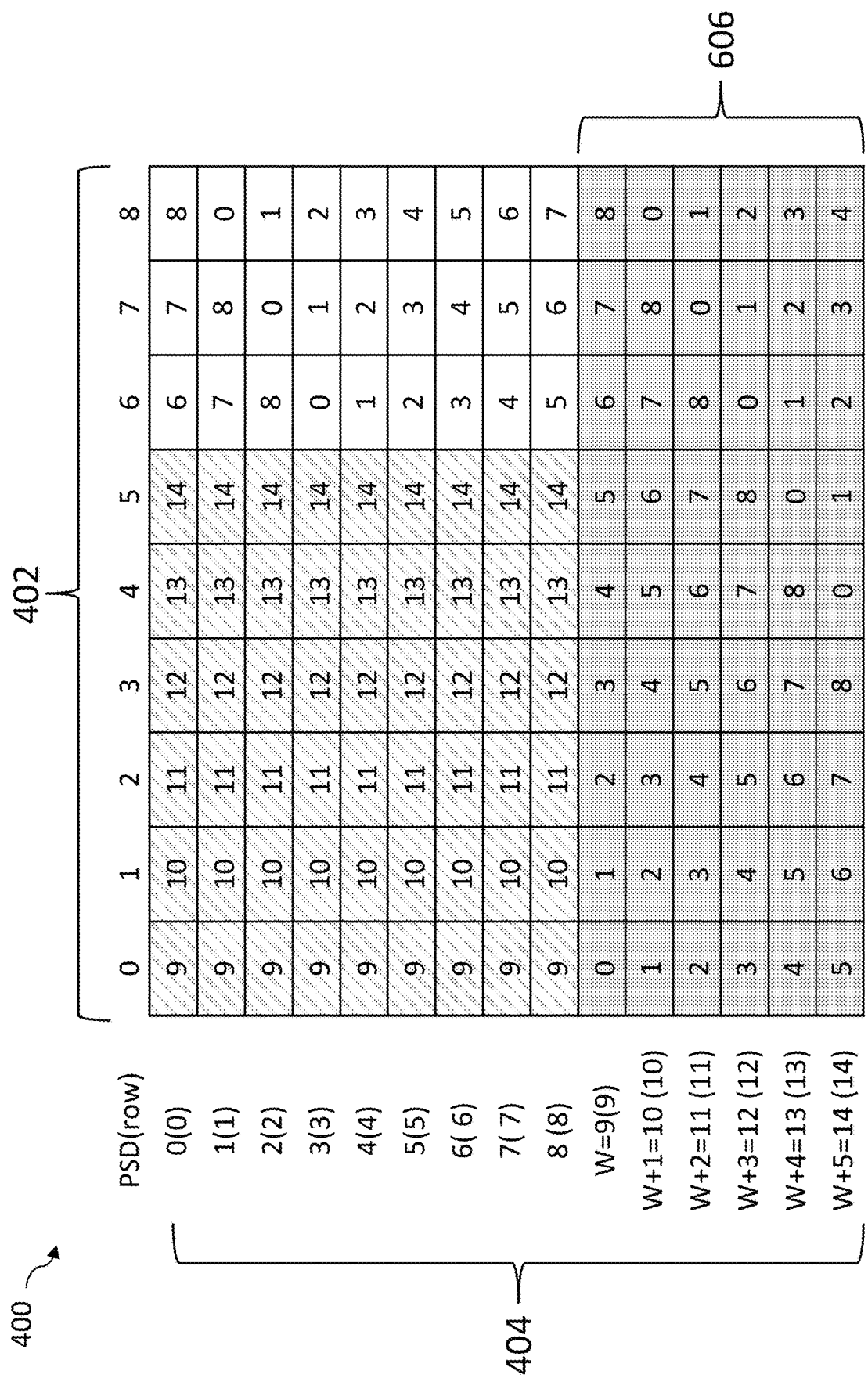

Returning to the method 500, in a step 508, columns [T-W]-[T-W+N-1] of rows 0-[W-1] may be assigned protection groups [T]-[T+N+1], respectively. For example, FIG. 9 illustrates an example of the performance of the step 506 when T=W=9 and N=6.

Returning to the step 502, if the answer is positive, the method 500 may proceed to a step 510. In the step 510, the linear process described in relation to the steps 504, 506 and 508 may be performed for the first K (=2*W-T) new PSDs on K columns of the PGM, specifically on cols. [T] to [2*W-1] of rows [0] to [W-1] for new PSDs [T] to [2*W-1]. In a step 512, the PGM may be split into a symmetrical PGM and a non-symmetrical PGM, where the new symmetrical PGM includes the rows [W] to [2*W-1] of the original PGM, and the new non-symmetrical PGM includes the rows [0] to [W-1] of the original PGM. It should be appreciated that the performance of the steps 510 and 512 would be the same whether T+N=2*W or T+N>2*W.

For example, FIG. 10A illustrates an example of performance of the steps 510-512 in response to a second addition of N rows after the first addition of N=6 PSDs illustrated in relation to FIGS. 6-9. The second addition of N may be for N=4 such that T+N=15+4=19, where 19>2*W=18, and K=18-15=3. Accordingly, the step 510 is performed for K=3 columns, namely columns 6-8, and the step 512 produces non-symmetrical PGM 400a and symmetrical PGM 400b. It should be appreciated that the same matrices 400a and 400b would result by the performance of the steps 510 and 512 if N=3 in the current example.

In a step 513, it may be determined whether T+N>2*W. If not, the method 500 may end. Otherwise, in a step 514, the linear process may be performed on the new symmetrical PGM for the remaining N-K new PSDs; i.e., PSDs [T-(2*W)] to [T+N-1].

For example, FIG. 10B illustrates an example of performance of the step 514 on the remaining N-K new PSDs; i.e., PSDs [T-(2*W)] to [T+N-1] in the above example where N=4 rows are added after the first addition of N=6 PSDs illustrated in relation to FIGS. 6-9. Per the example, the pivotal process may be performed on the remaining N-K=4-3=1 PSD (PSD 18), resulting in the transposition of column 0 to row 9 of the originally symmetrical PGM 400b as illustrated.

Figures 11, 12:
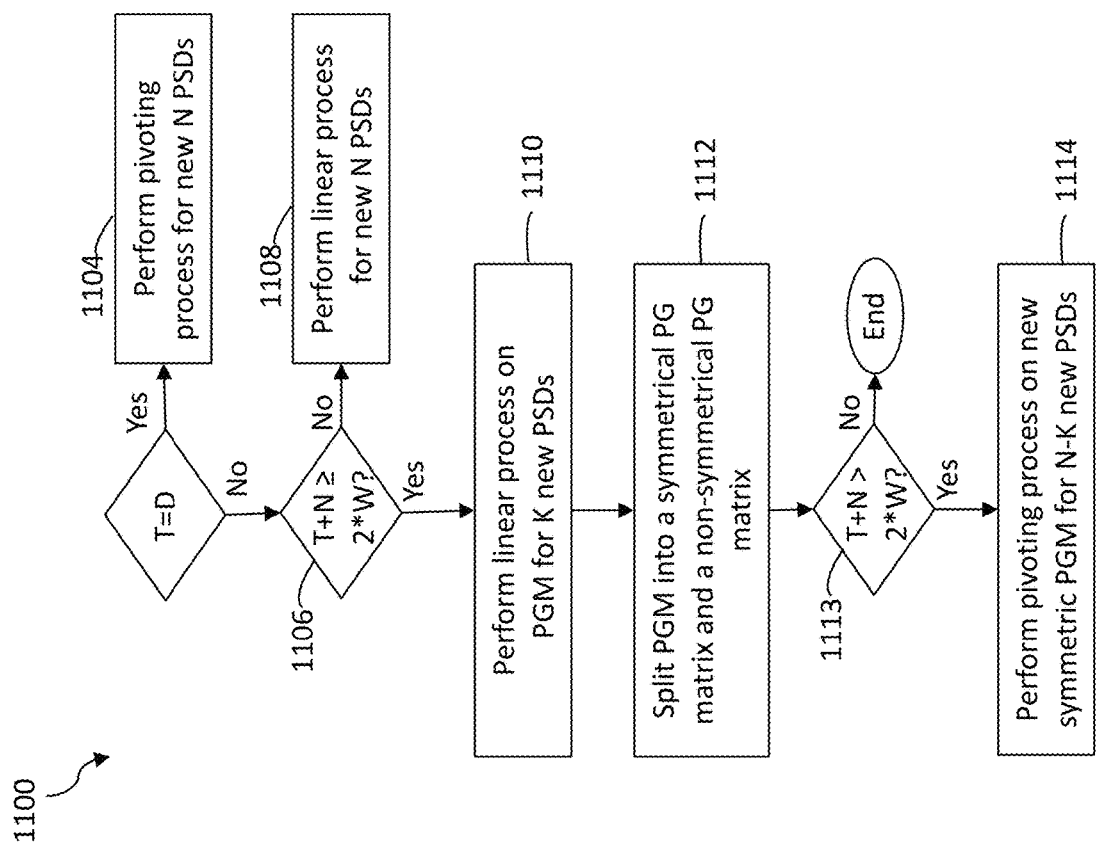
FIG. 11 is a flowchart illustrating another method of reconfiguring protection group membership for a protection group cluster in response to one or more physical storage device being added to the cluster, according to embodiments of the invention.
FIG. 12 is a flowchart illustrating a pivoting process for reconfiguring protection group membership for a protection group cluster in response to one or more physical storage device being added to the cluster, according to embodiments of the invention.

In some embodiments, the step 210 of the method 200 may be implemented by performing the method 1100 described in relation to the FIG. 11, including using the pivoting process as described herein and, in some cases, the linear process in addition thereto.

FIG. 11 is a flowchart illustrating a method 1100 of reconfiguring protection group membership for a PGC in response to one or more PSDs being added to the PGC, according to embodiments of the invention. Other embodiments of a method of reconfiguring protection group membership for a PGC in response to one or more PSDs being added to the cluster, for example, variations of the method 1100, are possible, and are intended to fall within the scope of the invention.

In a step 1102, it may be determined whether this is the first time PSDs have been added to the PGC; i.e., whether T=D. In some embodiments, the pivoting process is only performed the first time PSDs are added to the PGC. If it is the first time, i.e., T=D, then in a step 1104 the pivoting process may be performed, for example, by performance of the method 1200 described in connection with FIG. 12.

FIG. 12 is a flowchart illustrating a pivoting process 1200 for reconfiguring protection group membership for a PGC in response to one or more physical storage device being added to the cluster, according to embodiments of the invention. Other embodiments of a pivoting process for reconfiguring protection group membership for a PGC in response to one or more physical storage device being added to the cluster, for example, variations of the process 1200, are possible, and are intended to fall within the scope of the invention.

In a step 1202, new rows W-[W+N-1] may be added for the N new PSDs. FIG. 13 illustrates an example of performing the step 1202 on the PGM 400 when W=9 and N=6, in which N rows 1306 have been added to the PGM 400. The example of FIG. 13 illustrates a first addition of N (<W) PSDs to the PGC since being initially configured, such that T=W=9.

Figure 14:
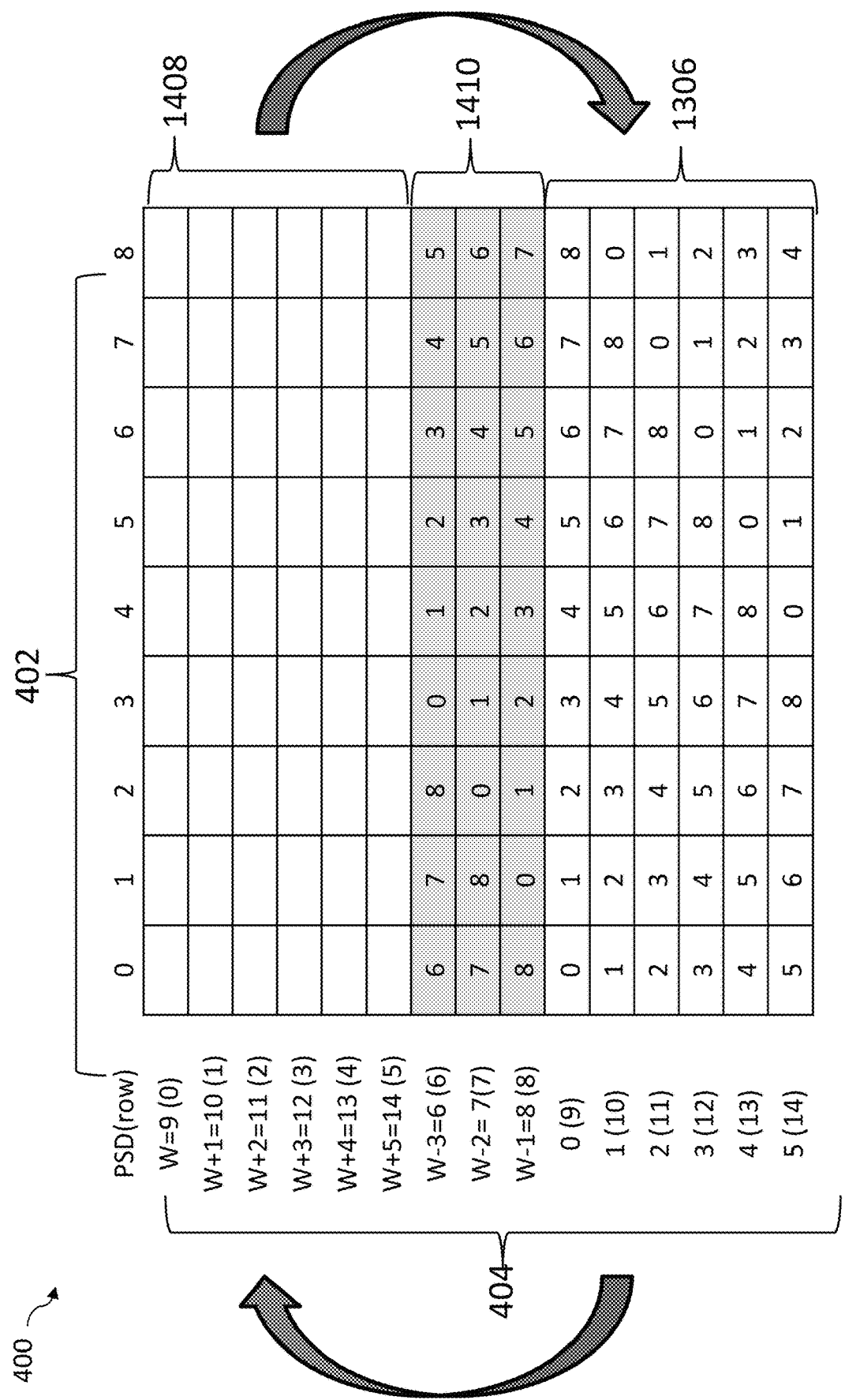

In a step 1204, positions of rows 0-[N−1] may be swapped with new rows W-[W+N−1]. That is, the added rows N and first N rows may be pivoted about the middle rows. FIG. 14 illustrates an example of performing the step 1204 on the PGM 400 when W=9 and N=6 after N rows 1306 have been added to the PGM 400. As illustrated, the added rows N 1306 and first N rows 1408 may be pivoted about the middle rows 1410.

In a step 1206, rows N-[W−1] of columns 0-[N−1] may be transposed to columns N-[W−1] of rows 0-[N−1]. For example, the step 1206 may implement the following transposition:

for (i=0; i<W−N; i++)
for (j=0; j<N; j++)
{PSD [W+j] partition[W−1−i]=PSD [W−1−i]. partition [j]}

Figure 15:
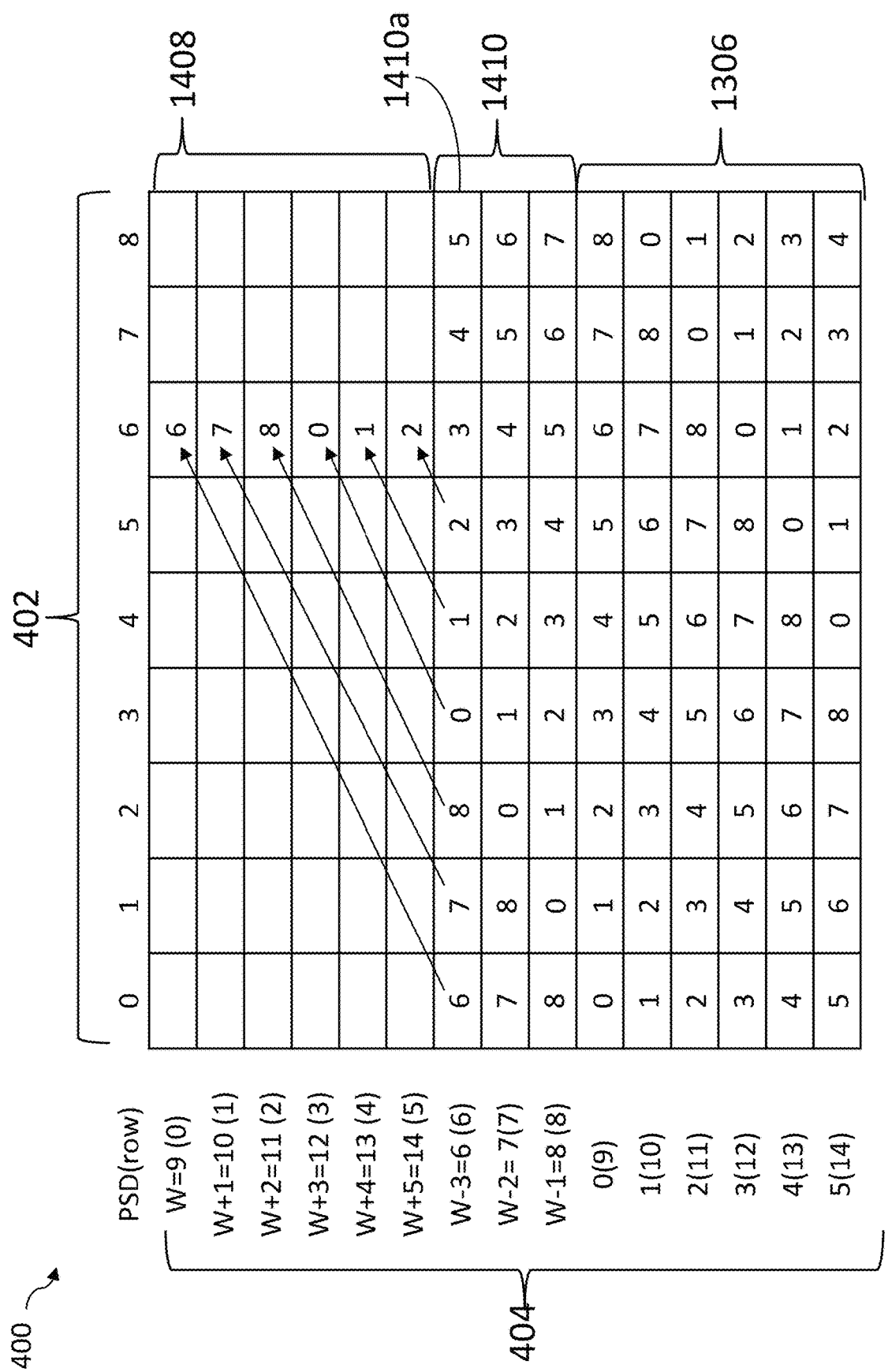

FIG. 15 illustrates an example of performing part of the transposition of the step 1206 on the PGM 400 when T=W=9 and N=6, i.e., the transposition of row N=6 1410a, columns 0-5 to column N=6, rows 0-5.

Figure 16:
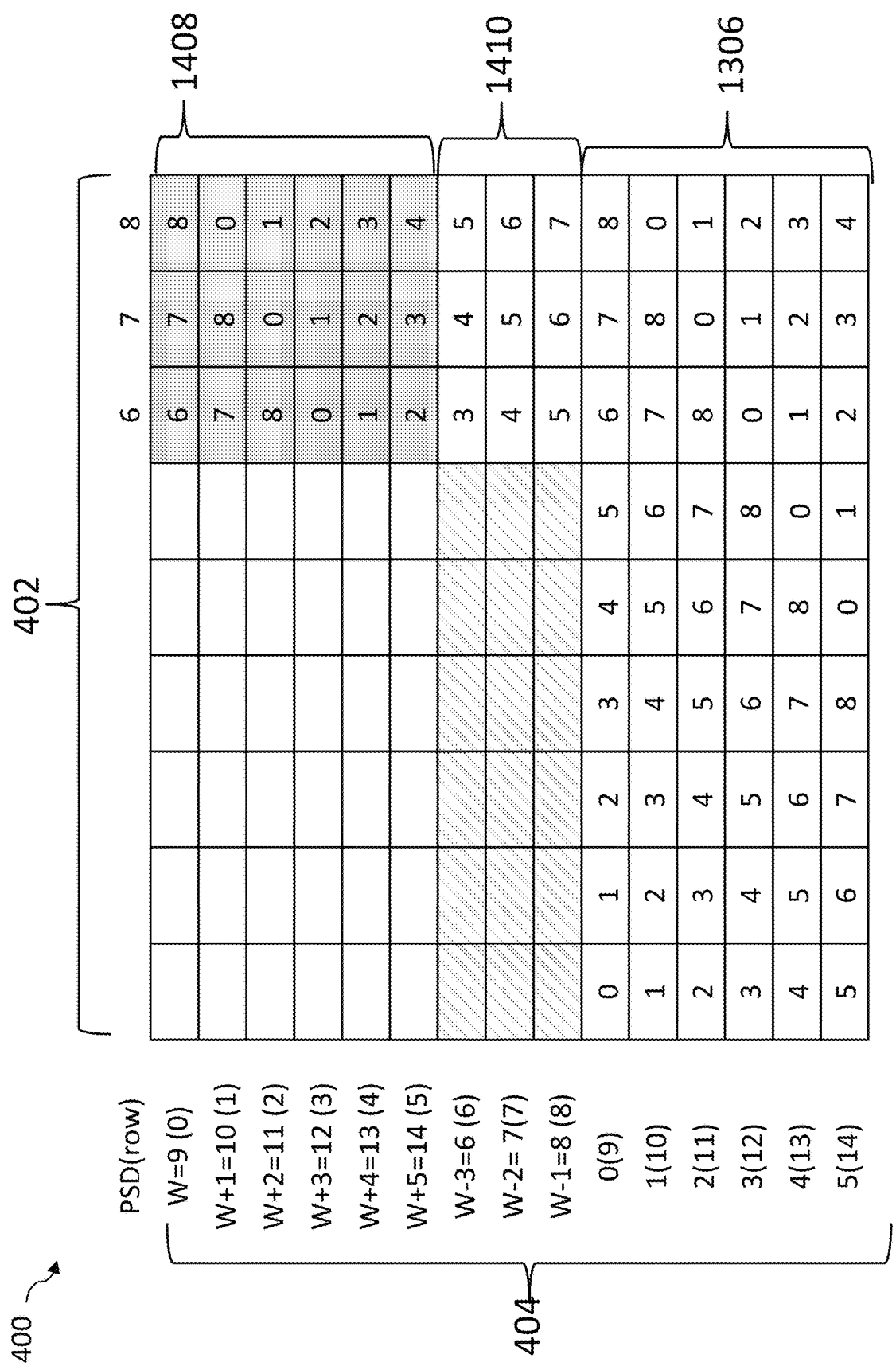

FIG. 16 illustrates an example of the complete performance of the transposition of the step 1206 when T=W=9 and N=6; i.e., the transposition of rows 6-8 of columns 0-5 to columns 6-8 of rows 0-5.

Returning to the method 1200, in a step 1208, columns 0-[N−1] of rows 0-[N−1] may be assigned to protection groups W-[W+N−1], respectively. FIG. 17 illustrates an example of the performance of the step 1208 when T=W=9 and N=6.

Returning to the method 1100, if it is determined in the step 1102 that T is not equal to D; i.e., that it is not the first addition of PSDs to the PGC since the PGC was initially configured, then in a step 1106 it may be determined whether T+N≥2*W. If T+N is not greater than or equal to 2*W, the linear process may be performed for the new PSDs, for example, in accordance with the step 503 of the method 500.

Figure 18:
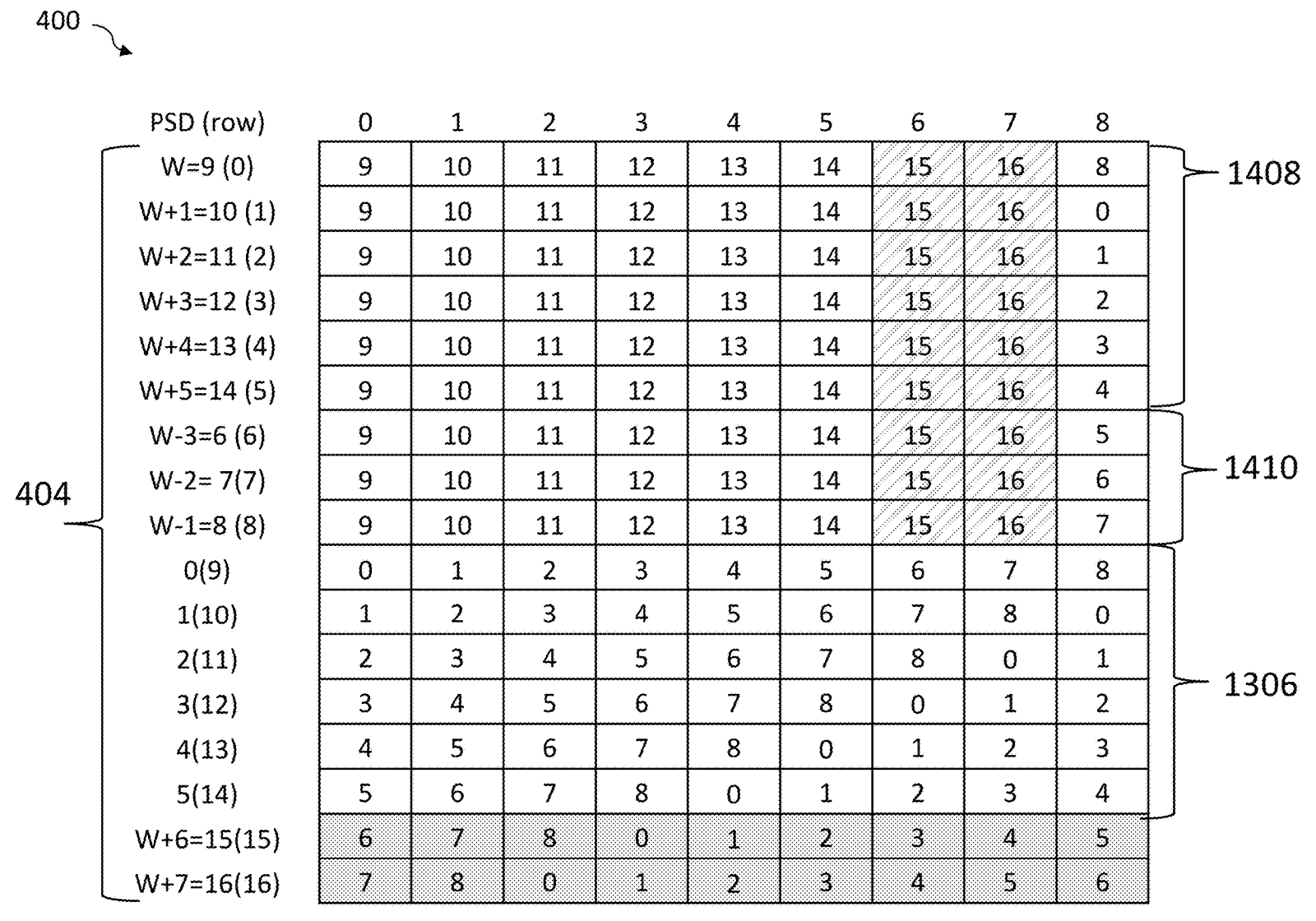

FIG. 18 illustrates an example of a performance of the method steps 504, 506 and 508 of the linear process in response to a second addition of N=2 PSDs after the first addition of N=6 PSDs illustrated in relation to FIGS. 13-16 and the second addition of N=2 PSDs illustrated in relation to FIG. 18, If it is determined that T+N>2*W in the step 1106, then, in a step 1110, the linear process described in relation to the steps 504, 506 and 508 may be performed for the first K (=2*W−T) new PSDs on K column of the PGM, specifically on cols. [T] to [2*W−1] of rows [0] to [W−1] for new PSDs [T] to [2*W−1].

In a step 1112, the PGM may be split into a symmetrical PGM and a non-symmetrical PGM, where the new symmetrical PGM includes the rows [W] to [2*W−1] of the original PGM, and the new non-symmetrical PGM includes the rows [0] to [W−1] of the original PGM. It should be appreciated that the performance of the steps 1110 and 1112 would be the same whether T+N=2*W or T+N>2*W.

For example, FIG. 19A illustrates an example of a performance of the steps 1110 and 1112 in response to a third addition of N=2 PSDs after the first addition of N=6 PSDs illustrated in relation to FIGS. 13-16 and the second addition of N=2 PSDs illustrated in relation to FIG. 18. The third addition of N PSDs may be for N=2 such that T+N=17+2=19, where 19>2*W=18, and K=18−17=1. Accordingly, the step 1110 (e.g., the steps 504, 506 and 508 of the method 500) is performed for K=1 columns, namely column 8 (specifically rows 0-8 or column 8) to produce an added new row W+8=17 of the original PGM. The step 1112 produces non-symmetrical PGM 400c and symmetrical PGM 400d. It should be appreciated that the same matrices 400c and 400d would result by the performance of the steps 1110 and 1112 if N=1 in the current example.

In a step 1113, it may be determined whether T+N>2*W. If not, the method 1100 may end. Otherwise, in a step 1114, the pivoting process may be performed on the new symmetrical PGM for the remaining N−K new PSDs; i.e., PSDs [T−(2*W)] to [T+N−1].

For example, FIG. 19B illustrates an example of performance of the step 1114 on the remaining N−K new PSDs; i.e., PSDs [T−(2*W)] to [T+N−1] in the above example where N=2 rows are added after the first addition of N=6 PSDs illustrated in relation to FIGS. 13-16 and the second addition of N=2 PSDs illustrated in relation to FIG. 18. Per the example, the pivotal process may be performed on the remaining N−K=2−1=1 PSD (PSD 18), resulting in the transposition of column 0 of rows 1-9 to columns 1-8 of row 0 of the PGM 400d as illustrated.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 200, 300, 500, 1100 and/or 1200, or parts thereof, may be implemented using one or more of the systems and/or data structures described in relation to FIGS. 1, 4, 6-10 and 13-19 or components thereof. For example, any such methods or portions thereof may be implemented by any of the directors 37a-n, for example, EDS adapter 29, and/or management module 22, or another component or logic residing on the storage system 20a or external thereto. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, or any suitable combination thereof.

Software implementations of embodiments of the invention may include executable code that is stored on one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate operating system.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features.

Furthermore, a description or recitation in the general form of "at least one of [a], [b] or [c]," or equivalent thereof,

What is claimed is:

1. A method of configuring protection groups for physical storage devices of a storage system, comprising:
   partitioning each of a first quantity (W) of physical storage device into W partitions;
   creating a first matrix including W columns and W rows, each row representing one of the W physical storage devices and each column representing one of the W partitions of each of the W physical storage devices;
   using the first matrix to assign, for each of the W physical storage devices, a different one of W protection groups to each of the W partitions of the physical storage device;
   adding a second quantity (N) of physical storage devices to the storage system, wherein N<W, to produce a third quantity (T=W+N) of physical storage devices;
   partitioning each of the N physical storage devices into W partitions;
   adding N protection groups to the W protection groups to produce T protection groups;
   expanding the first matrix to accommodate T physical storage devices and T protection groups;
   assigning the T protection groups to the W partitions of each of the T physical storage devices based on the expanded matrix; and
   based on the assigning, moving data from at least a first of the W partitions on at least a first of the T physical devices to at least a second of the W partitions on at least a second of the T physical devices.

2. The method of claim 1, wherein the assigning of the T protection groups assigns, for each of the T physical storage devices, a different one of T protection groups to each of the W partitions of the physical storage device, including re-assigning only W*(W−N) protection groups from a respective first of W partitions for a first of the W physical storage devices to a respective second of W partitions for a second of the T physical storage devices, wherein the method further comprises:
   moving only data of the W*(W−N) protection groups according to the re-assigning.

3. The method of claim 1, wherein expanding the first matrix includes:
   adding N rows to the W rows of the first matrix to produce T rows; and
   transposing N columns from a fifth quantity (X=W−N) of the W rows to X columns of the added N rows.

4. The method of claim 3, wherein expanding the first matrix includes:
   before the transposing, swapping positions of the added N rows in the first matrix with positions of rows 0 through [N−1] in the matrix.

5. The method of claim 3, further comprising:
   after adding the N physical storage devices to the storage system, adding a sixth quantity (O) of physical storage devices to the storage system to produce a seventh quantity (T+O) of physical storage devices;
   partitioning each of the added O physical storage devices into W partitions;
   adding O protection groups to the T protection groups to produce T+O protection groups;
   further expanding the first matrix to accommodate the O new physical storage devices, including:
      adding O rows to the T rows of the first matrix, and
      transposing W rows from O columns to the added O rows; and
   assigning the T+O protection groups to the W partitions of each of the T+O physical storage devices based on the further expanded matrix.

6. The method of claim 1, further comprising:
   after adding the N physical storage devices to the storage system, adding a sixth quantity (O) of physical storage devices to the storage system to produce a seventh quantity (T+O) of physical storage devices;
   partitioning each of the added O physical storage devices into W partitions;
   adding O protection groups to the T protection groups to produce T+O protection groups;
   determining if T+O>2*W;
   if T+O>2*W, splitting the expanded first matrix into a second matrix and a third matric matrix; and
   assigning the T+O protection groups to the W partitions of each of the T physical storage devices based on the second matrix and the third matrix.

7. The method of claim 6, wherein the expanding of the first matrix into a second matrix and a third matric matrix includes:
   configuring the second matrix to have vertically-aligned protection group assignments not subject to change in response to further additions of physical storage devices to the storage system; and
   configuring the third matrix to have diagonally-aligned protection group assignments subject to change in response to further additions of physical storage devices to the storage system.

8. A system for configuring protection groups for physical storage devices of a storage system, the system comprising executable logic that implements a method including:
   partitioning each of a first quantity (W) of physical storage device into W partitions;
   creating a first matrix including W columns and W rows, each row representing one of the W physical storage devices and each column representing one of the W partitions of each of the W physical storage devices;
   using the first matrix to assign, for each of the W physical storage devices, a different one of W protection groups to each of the W partitions of the physical storage device;
   adding a second quantity (N) of physical storage devices to the storage system, wherein N<W, to produce a third quantity (T=W+N) of physical storage devices;
   partitioning each of the N physical storage devices into W partitions;
   adding N protection groups to the W protection groups to produce T protection groups;
   expanding the first matrix to accommodate T physical storage devices and T protection groups;

assigning the T protection groups to the W partitions of each of the T physical storage devices based on the expanded matrix; and based on the assigning, moving data from at least a first of the W partitions on at least a first of the T physical devices to at least a second of the W partitions on at least a second of the T physical devices.

9. The system of claim 8, wherein the assigning of the T protection groups assigns, for each of the T physical storage devices, a different one of T protection groups to each of the W partitions of the physical storage device, including re-assigning only W*(W−N) protection groups from a respective first of W partitions for a first of the W physical storage devices to a respective second of W partitions for a second of the T physical storage devices, wherein the method further includes:

moving only data of the W*(W−N) protection groups according to the re-assigning.

10. The system of claim 8, wherein expanding the first matrix includes:

adding N rows to the W rows of the first matrix to produce T rows; and transposing N columns from a fifth quantity (X=W−N) of the W rows to X columns of the added N rows.

11. The system of claim 10, wherein expanding the first matrix includes:

before the transposing, swapping positions of the added N rows in the first matrix with positions of rows 0 through [N−1] in the matrix.

12. The system of claim 10, wherein the method further includes:

after adding the N physical storage devices to the storage system, adding a sixth quantity (O) of physical storage devices to the storage system to produce a seventh quantity (T+O) of physical storage devices;

partitioning each of the added O physical storage devices into W partitions;

adding O protection groups to the T protection groups to produce T+O protection groups;

further expanding the first matrix to accommodate the O new physical storage devices, including:

adding O rows to the T rows of the first matrix, and transposing W rows from O columns to the added O rows; and assigning the T+O protection groups to the W partitions of each of the T+O physical storage devices based on the further expanded matrix.

13. The system of claim 8, wherein the method further includes:

after adding the N physical storage devices to the storage system, adding a sixth quantity (O) of physical storage devices to the storage system to produce a seventh quantity (T+O) of physical storage devices;

partitioning each of the added O physical storage devices into W partitions;

adding O protection groups to the T protection groups to produce T+O protection groups;

determining if T+O>2*W;

if T+O>2*W, splitting the expanded first matrix into a second matrix and a third matric matrix; and assigning the T+O protection groups to the W partitions of each of the T physical storage devices based on the second matrix and the third matrix.

14. The system of claim 13, wherein the expanding of the first matrix into a second matrix and a third matric matrix includes:

configuring the second matrix to have vertically-aligned protection group assignments not subject to change in response to further additions of physical storage devices to the storage system; and configuring the third matrix to have diagonally-aligned protection group assignments subject to change in response to further additions of physical storage devices to the storage system.

15. One or more non-transitory computer-readable media having code stored thereon that, when executed, performs a method of configuring protection groups for physical storage devices of a storage system, the method comprising:

partitioning each of a first quantity (W) of physical storage device into W partitions;

creating a first matrix including W columns and W rows, each row representing one of the W physical storage devices and each column representing one of the W partitions of each of the W physical storage devices;

using the first matrix to assign, for each of the W physical storage devices, a different one of W protection groups to each of the W partitions of the physical storage device;

adding a second quantity (N) of physical storage devices to the storage system, wherein N<W, to produce a third quantity (T=W+N) of physical storage devices;

partitioning each of the N physical storage devices into W partitions; executable code that controls adding N protection groups to the W protection groups to produce T protection groups;

expanding the first matrix to accommodate T physical storage devices and T protection groups;

assigning the T protection groups to the W partitions of each of the T physical storage devices based on the expanded matrix; and based on the assigning, moving data from at least a first of the W partitions on at least a first of the T physical devices to at least a second of the W partitions on at least a second of the T physical devices.

16. The one or more non-transitory computer-readable media of claim 15, wherein the assigning of the T protection groups assigns, for each of the T physical storage devices, a different one of T protection groups to each of the W partitions of the physical storage device, including re-assigning only W*(W−N) protection groups from a respective first of W partitions for a first of the W physical storage devices to a respective second of W partitions for a second of the T physical storage devices, wherein the method further comprises:

moving only data of the W*(W−N) protection groups according to the re-assigning.

17. The one or more non-transitory computer-readable media of claim 15, wherein expanding the first matrix includes:

adding N rows to the W rows of the first matrix to produce T rows; and transposing N columns from a fifth quantity (X=W−N) of the W rows to X columns of the added N rows.

18. The one or more non-transitory computer-readable media of claim 17, wherein expanding the first matrix includes:

before the transposing, swapping positions of the added N rows in the first matrix with positions of rows 0 through [N−1] in the matrix.

19. The one or more non-transitory computer-readable media of claim 17, wherein the method further comprises:

adding the N physical storage devices to the storage system, adding a sixth quantity (O) of physical storage devices to the storage system to produce a seventh quantity (T+O) of physical storage devices;

partitioning each of the added O physical storage devices into W partitions;

adding O protection groups to the T protection groups to produce T+O protection groups;

further expanding the first matrix to accommodate the O new physical storage devices, including:
   adding O rows to the T rows of the first matrix, and
   transposing W rows from O columns to the added O rows; and assigning the T+O protection groups to the W partitions of each of the T+O physical storage devices based on the further expanded matrix.

20. The one or more non-transitory computer-readable media of claim 15, wherein the method further comprises:

after adding the N physical storage devices to the storage system, adding a sixth quantity (O) of physical storage devices to the storage system to produce a seventh quantity (T+O) of physical storage devices;

partitioning each of the added O physical storage devices into W partitions;

adding O protection groups to the T protection groups to produce T+O protection groups;

determining if T+O>2*W;

if T+O>2*W, splitting the expanded first matrix into a second matrix and a third matric matrix; and assigning the T+O protection groups to the W partitions of each of the T physical storage devices based on the second matrix and the third matrix.

* * * * *